(12) United States Patent  (10) Patent No.: US 10,911,831 B2
Katsuki et al.  (45) Date of Patent: Feb. 2, 2021

(54) INFORMATION PROCESSING APPARATUS, INFORMATION PROCESSING METHOD, PROGRAM, AND INFORMATION PROCESSING SYSTEM

(71) Applicant: Sony Corporation, Tokyo (JP)

(72) Inventors: Kazuya Katsuki, Tokyo (JP); Hiroyuki Mitsubori, Kanagawa (JP); Shinpei Kameoka, Tokyo (JP); Takuo Watanabe, Tokyo (JP); Hiroyuki Kubota, Tokyo (JP); Toshihiko Fushimi, Cupertino, CA (US)

(73) Assignee: Sony Corporation

( * ) Notice: Subject to any disclaimer, the term of this patent is extended or adjusted under 35 U.S.C. 154(b) by 0 days.

(21) Appl. No.: 16/329,004

(22) PCT Filed: Sep. 12, 2017

(86) PCT No.: PCT/JP2017/032750
§ 371 (c)(1),
(2) Date: Feb. 27, 2019

(87) PCT Pub. No.: WO2018/056105
PCT Pub. Date: Mar. 29, 2018

(65) Prior Publication Data
US 2019/0208280 A1  Jul. 4, 2019

(30) Foreign Application Priority Data
Sep. 26, 2016 (JP) ................................. 2016-186973

(51) Int. Cl.
*H04N 21/422* (2011.01)
*H04N 21/472* (2011.01)
(Continued)

(52) U.S. Cl.
CPC ....... *H04N 21/47214* (2013.01); *G06F 16/00* (2019.01); *G06F 16/73* (2019.01);
(Continued)

(58) Field of Classification Search
CPC ................................ H04N 21/42203
See application file for complete search history.

(56) References Cited

U.S. PATENT DOCUMENTS 9,392,324 B1 *  7/2016  Maltar ............. H04N 21/47214
2011/0123004 A1 *  5/2011  Chang ................... G06F 16/433
379/88.01
(Continued)

FOREIGN PATENT DOCUMENTS

EP  1037463 A2  9/2000
EP  1983667 A2  10/2008
(Continued)

OTHER PUBLICATIONS

International Search Report for PCT/JP2017/032750, dated Dec. 12, 2017, 3 pgs.
(Continued)

*Primary Examiner* — Michael H Hong
(74) *Attorney, Agent, or Firm* — Lerner, David, Littenberg, Krumholz & Mentlik, LLP

(57) ABSTRACT

An information processing apparatus according to an aspect of the present technology performs a search for a recorded program and a program to be provided later to acquire a first search result in a case where a character string indicating content of an utterance of a user does not include a predetermined character string indicating the setting of the schedule recording of the program to be provided later and performs a search for the program to be provided later to acquire a second search result in a case where the character string includes the predetermined character string. In a case
(Continued)

where a program whose schedule recording is to be set is selected from a display screen of the second search result, the information processing apparatus sets the schedule recording of the selected program without displaying a detail screen.

12 Claims, 19 Drawing Sheets

(51) Int. Cl.

| | | |
|---|---|---|
| G10L 15/30 | (2013.01) | |
| H04N 5/76 | (2006.01) | |
| G11B 27/34 | (2006.01) | |
| G11B 20/10 | (2006.01) | |
| G06F 16/00 | (2019.01) | |
| G06F 16/73 | (2019.01) | |
| G10L 15/08 | (2006.01) | |
| G10L 15/22 | (2006.01) | |
| H04N 21/482 | (2011.01) | |
| H04N 21/6543 | (2011.01) | |
| H04N 5/765 | (2006.01) | |

(52) U.S. Cl.
CPC ............ *G10L 15/08* (2013.01); *G10L 15/22* (2013.01); *G10L 15/30* (2013.01); *G11B 20/10* (2013.01); *G11B 20/10527* (2013.01); *G11B 27/34* (2013.01); *H04N 5/76* (2013.01); *H04N 21/42203* (2013.01); *H04N 21/47217* (2013.01); *H04N 21/4828* (2013.01); *H04N 21/6543* (2013.01); *G10L 2015/223* (2013.01); *G11B 2020/10537* (2013.01); *H04N 5/765* (2013.01)

(56) References Cited

U.S. PATENT DOCUMENTS

| | | | |
|---|---|---|---|
| 2015/0052169 A1* | 2/2015 | Ojima | ............. H04N 21/47217 707/769 |
| 2016/0276008 A1* | 9/2016 | Saida | ................. G11C 11/1693 |

FOREIGN PATENT DOCUMENTS

| | | |
|---|---|---|
| JP | 2001094912 A | 4/2001 |
| JP | 2007140194 A | 6/2007 |
| JP | 2011118775 A | 6/2011 |
| JP | 2012129758 A | 7/2012 |
| JP | 2016062560 A | 4/2016 |

OTHER PUBLICATIONS

Extended European Search Report including Written Opinion for Application No. EP17852882.4, dated Sep. 12, 2019, pp. 1-11.

* cited by examiner

"NEXT WEEK'S ○○○○ DRAMA"

TENSE : NEXT WEEK
PROPER NOUN (PERSON'S NAME) : ○○○○
GENRE : DRAMA

FIG. 12
"SCHEDULE "XXX" (AND)"
"RECORD "XXX" (AND)"
"SCHEDULE RECORDING OF "XXX""
SCHEDULE RECORDING SETTING COMMAND
"RECORD NEXT WEEK'S ○○○○ DRAMA"
| | |
|---|---|
| TENSE | : NEXT WEEK |
| PROPER NOUN (PERSON'S NAME) | : ○○○○ |
| GENRE | : DRAMA |
| COMMAND | : SCHEDULE RECORDING SETTING |

INFORMATION PROCESSING APPARATUS, INFORMATION PROCESSING METHOD, PROGRAM, AND INFORMATION PROCESSING SYSTEM

CROSS-REFERENCE TO RELATED APPLICATIONS

This application is a national phase entry under 35 U.S.C. § 371 of International Application No. PCT/JP2017/032750 filed Sep. 12, 2017, which claims the priority from Japanese Patent Application No. 2016-186973 filed in the Japanese Patent Office on Sep. 26, 2016, the entire contents of which are hereby incorporated by reference.

TECHNICAL FIELD

The present technology relates to an information processing apparatus, an information processing method, a program, and an information processing system, and more particularly to, an information processing apparatus, an information processing method, a program, and an information processing system that enable a user to easily set the schedule recording of programs listed as search results.

BACKGROUND ART

In recent years, the accuracy of voice recognition has been improved. For example, some television sets can search for programs on the basis of the words uttered by the user through a microphone provided in a remote controller or the like.

The user selects a predetermined program from the programs listed as the search results to set the schedule recording of the program or to start the playback of a recorded program.

CITATION LIST

Patent Document

Patent Document 1: Japanese Patent Application Laid-Open No. 2011-118775

SUMMARY OF THE INVENTION

Problems to be Solved by the Invention

In some cases, the content of words uttered by the user to search for a program includes information that can specify what the user is going to do with the searched program. For example, in a case where the user utters a sentence "Record next week's ○○○○ drama", it can be presumed that the user intends to record drama programs related to "○○○○".

The present technology has been made in view of such a situation and an object of the present technology is to provide a technique that enables a user to easily set the schedule recording of programs listed as search results.

Solutions to Problems

An information processing apparatus according to an aspect of the present technology includes: a program search unit that performs a search for a recorded program and a program to be provided later on the basis of a character string indicating content of an utterance of a user to acquire a first search result in a case where the character string does not include a first character string indicating setting of schedule recording of the program to be provided later and performs a search for the program to be provided later on the basis of the character string to acquire a second search result in a case where the character string includes the first character string; a display control unit that performs control such that a display screen of the first search result or a display screen of the second search result is displayed; and a setting unit that, in a case where a predetermined program to be provided later is selected as a program whose schedule recording is to be set from the display screen of the first search result, displays a detail screen including information related to the predetermined program, instead of the display screen of the first search result, and sets the schedule recording of the predetermined program; and, in a case where a program whose schedule recording is to be set is selected from the display screen of the second search result, sets the schedule recording of the selected program without displaying the detail screen.

In the aspect of the present technology, in a case where the character string indicating the content of the utterance of the user does not include the first character string indicating the setting of the schedule recording of the program to be provided later, a search is performed for the recorded program and the program to be provided later on the basis of the character string to acquire the first search result. In a case where a predetermined program to be provided later is selected as a program whose schedule recording is to be set from the display screen of the first search result, the detail screen including the information related to the predetermined program is displayed, instead of the display screen of the first search result, and the schedule recording of the predetermined program is set. In addition, in a case where the character string indicating the content of the utterance of the user includes the first character string, a search is performed for the program to be provided later on the basis of the character string to acquire the second search result. In a case where a program whose schedule recording is to be set is selected from the display screen of the second search result, the schedule recording of the selected program is set without displaying the detail screen.

Further, an information processing system according to another aspect of the present technology includes a server and an information processing apparatus. The server includes: a search unit that specifies a program whose schedule recording is to be set in a case where a character string indicating content of an utterance of a user includes a first character string indicating setting of the schedule recording of a program to be provided later; and a communication unit that transmits identification information of the specified program and a first command to set schedule recording to the information processing apparatus in a case where the program whose schedule recording is to be set is specified and transmits a search result of content based on the character string to the information processing apparatus in a case where the program whose schedule recording is to be set is not specified. In addition, the information processing apparatus includes: a communication unit that transmits audio data of the utterance to the server and receives information transmitted from the server; a program search unit that searches for a program on the basis of the character string transmitted from the server; a display control unit that performs control such that a display screen including the search result of the content and a search result of the program is displayed in a case where the search result of the content is transmitted from the server; and a setting unit that sets the schedule recording of a program identified by the identification information, without displaying the display screen, in a case where the identification information and the first command are transmitted from the server.

Effects of the Invention

According to the present technology, it is possible to easily set the schedule recording of programs listed as search results.

In addition, the effects described therein are not necessarily limited and may be any of the effects described in the present disclosure.

BRIEF DESCRIPTION OF DRAWINGS

FIG. 12 is a diagram illustrating another example of the specification of the intention of the user.

MODE FOR CARRYING OUT THE INVENTION

Hereinafter, embodiments of the present technology will be described. The description will be made in the following order.

Figure 1:
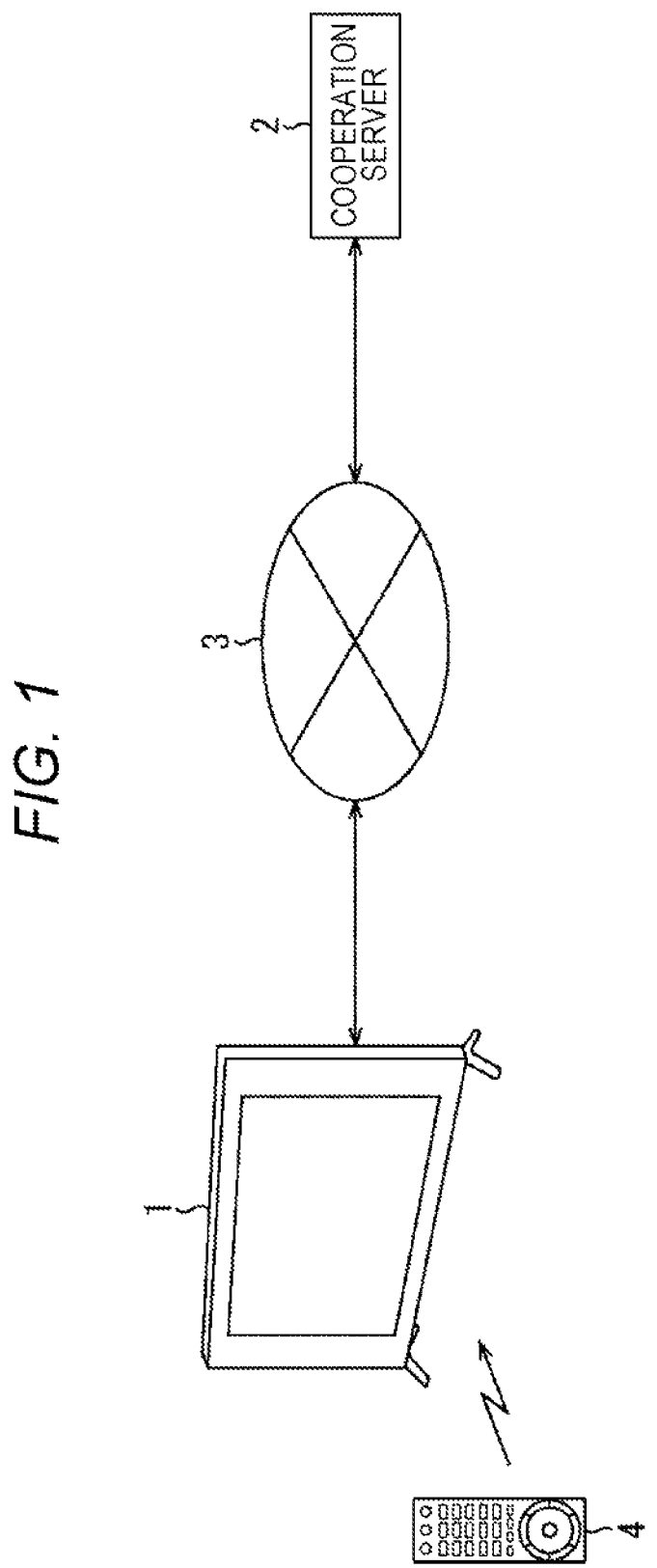
FIG. 1 is a diagram illustrating an example of the configuration of an information processing system according to an embodiment of the present technology.

1. Example of Configuration of Information Processing System
2. Example of Display of Search Result
3. First Search Example (Example of Search Using Character Strings with Different Granularities)
4. Second Search Example (Example in which Search Range is Refined According to Content of Utterance)
5. Third Search Example (Example in which Server Specifies Program)
6. Modification Examples 1. Example of Configuration of Information Processing System FIG. 1 is a diagram illustrating an example of the configuration of an information processing system according to an embodiment of the present technology.

An information processing system illustrated in FIG. 1 has a configuration in which a television set 1 (hereinafter, appropriately referred to as a TV 1) and a cooperation server 2 are connected to each other by a network 3 such as the Internet.

Communication is performed between the TV 1 and the cooperation server 2 through the network 3. The network 3 may be any one of a wired network, a wireless network, and a combination of the wired network and the wireless network.

The TV 1 receives television broadcasting, such as terrestrial digital broadcasts, satellite broadcasts, or cable broadcasts. The TV 1 displays a video of a broadcast program on a display and outputs a voice of the program from a speaker. Programs may be provided through the network 3.

In addition, the TV 1 has a function of recording a received program on an embedded recording medium or an external recording medium and a function of playing hack a recorded program. A recorder connected to the TV 1 may record programs.

Figure 2:
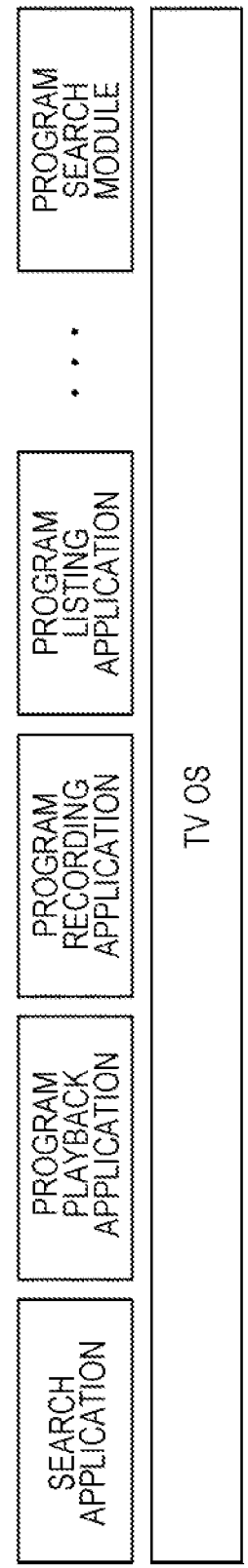
FIG. 2 is a diagram illustrating an example of the application structure of a TV.

FIG. 2 is a diagram illustrating an example of an application structure of the TV 1.

The TV 1 is provided with a TV operating system (OS). Various applications, such as a search application, a program playback application, a program recording application, and a program listing application, operate on the TV OS in cooperation with the TV OS.

The search application illustrated in FIG. 2 is an application that searches for, for example, Web content. The content includes various kinds of digital data that can be used by a user and include moving images, still images, music, games, electronic books, applications, and two or more combinations thereof.

The program playback application is an application that plays back, for example, a program that is being broadcast and a recorded program. The program recording application is an application that records a program. The program listing application is an application that performs the display of an electronic program guide (EPG), the management of the schedule recording of programs, and the like.

Various modules including a program search module that cooperates with the search application are provided in the TV 1. For example, the program search module performs a program search process of searching for a program inserted into the EPG, a program search process of searching for a recorded program, and the like. While the search application searches for Web content which is external content provided through the network 3, the program search module can search for content in the TV 1.

For example, the search application is software provided by a company that provides the TV OS. In contrast, the program search module is software provided by a company that is provided with software, such as the TV OS or the search application, and manufactures and sells the TV 1.

These programs are executed to implement various functions, such as a program receiving function, a program recording function, a recorded program playback function, and a program search function.

The TV 1 having the various functions is operated by a remote controller 4. The remote controller 4 transmits information indicating the content of an operation of the user to the TV 1.

The remote controller 4 is provided with buttons used for various operations and a microphone. In a case where a microphone button is pressed, the remote controller 4 collects the user's voice through the microphone and transmits audio data to the TV 1.

The TV 1 can search for various types of content including a program using a voice, which will be described below. Of course, the TV 1 can search for content, using a character string manually input by a button provided in the remote controller 4. Next, a case where content is searched using a voice will be mainly described.

The cooperation server 2 is a server that is managed by a company providing the TV OS. The cooperation server 2 provides various functions, such as a Web content search function and a function of recognizing the voice transmitted from the TV 1, to each apparatus including the TV 1 which is provided with the TV OS.

2. Example of Display of Search Result

Figure 3:
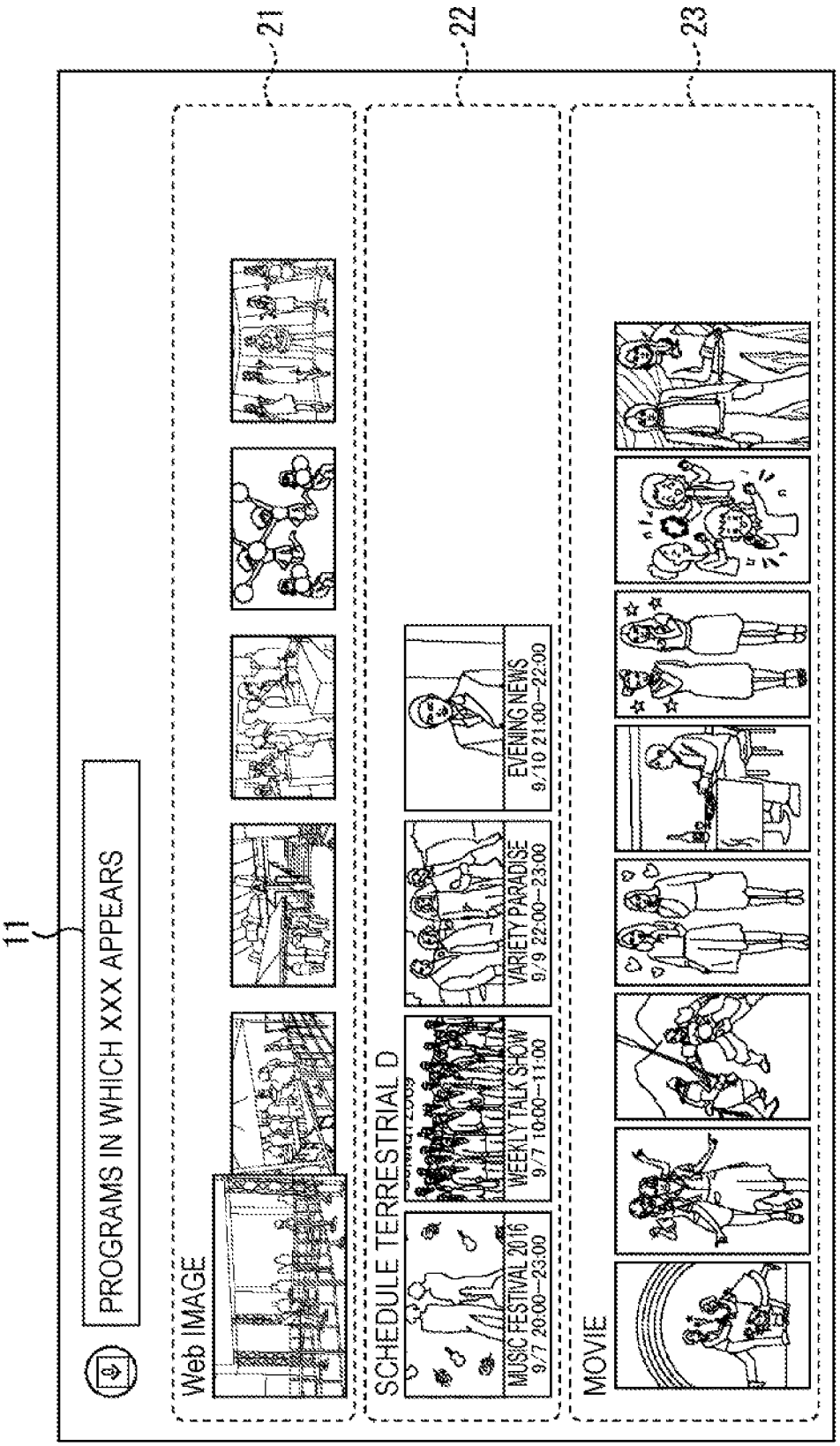
FIG. 3 is a diagram illustrating an example of a search result screen.

FIG. 3 is a diagram illustrating an example of a search result screen.

For example, in a case where the user operates the remote controller 4 to perform the search function and utters words indicating a search key, the search result screen illustrated in FIG. 3 is displayed on the display of the TV 1.

A character string display field 11 which is a display field for a character string as a content search key is formed in an upper part of the search result screen. In the example illustrated in FIG. 3, a character string "a program in which XXX appears" is displayed. The TV 1 enables the user to search for content using a natural language that is used daily.

In a case where the user presses the microphone button of the remote controller 4 and utters words, the remote controller 4 transmits audio data to the TV 1. The audio data transmitted to the TV 1 is transmitted to the cooperation server 2 and the cooperation server 2 performs voice recognition. The character string display field 11 is displayed on the basis of the result of the voice recognition transmitted from the cooperation server 2.

A Web moving image region 21, a program region 22, and a movie region 23 are sequentially formed below the character string display field 11 from the upper side. Card-shaped images that indicate content listed as the search results are displayed side by side. Hereinafter, the card-shaped images indicating content are simply referred to as card images as appropriate.

The Web moving image region 21 is a region in which a row of card images indicating Web moving images are displayed. For example, the cooperation server 2 provides a service that distributes moving images posted by various users. The card images displayed in the Web moving image region 21 are images indicating moving images searched from the moving images distributed by the moving image distribution service of the cooperation server 2.

The program region 22 is a region in which a row of card images indicating programs is displayed. Characters "Schedule terrestrial D" are displayed above the leftmost card image. The card images displayed in the program region 22 illustrated in FIG. 3 are images indicating the programs whose schedule recording can be set and which have been searched from the programs that are currently being broadcast and the programs scheduled to be broadcast, that is, the programs to be broadcast later.

One card image indicating a program is divided into two upper and lower stages. A thumbnail image of the program is displayed in the upper stage of the card image and program information including a program name, a broadcasting date, and the like, and time is displayed in the lower stage.

The movie region 23 is a region in which a row of card images indicating Web movie content is displayed. For example, the cooperation server 2 also provides a service that downloads movie content or sells movie content using streaming. The card images displayed in the movie region 23 are images indicating movie content searched from the movie content sold by the cooperation server 2.

In addition, dashed lines indicating the Web moving image region 21, the program region 22, and the movie region 23 are not actually displayed on the screen. Regions in which the search results of content in other categories are displayed are arranged below the movie region 23, which is not displayed on the search result screen illustrated in FIG. 3. The user scrolls the display ranges to see the search results of content in other categories which are not displayed.

The search results displayed in the Web moving image region 21 and the movie region 23 are obtained by performing a search, collectively using the entire character string indicating the content of an utterance of the user, that is, the entire character string displayed in the character string display field 11 as a key, which will be described in detail below.

In contrast, the search results displayed in the program region 22 are obtained by performing a search using decomposed character strings obtained as the syntax analysis result of the character string indicating the content of the utterance of the user.

The results obtained by performing a search on the basis of the entire character string input by the user and the results obtained by performing a search on the basis of the decomposed character strings forming the character string are displayed on one search result screen.

Figure 4:
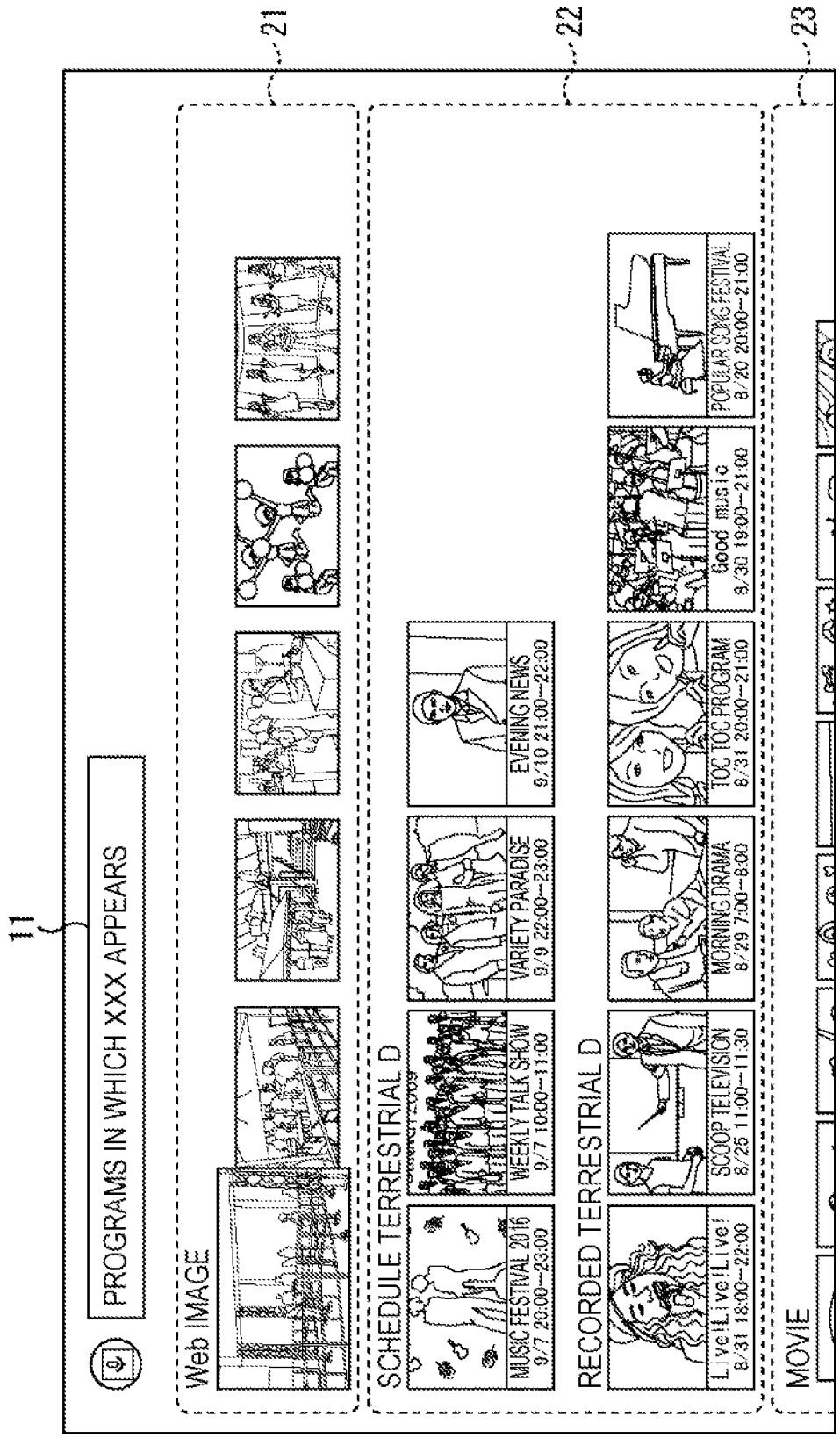
FIG. 4 is a diagram illustrating another example of the search result screen.

FIG. 4 is a diagram illustrating another example of the search result screen.

In some cases, a row of card images indicating the programs whose schedule recording can be set and a row of card images indicating the recorded programs are displayed in the program region 22. Of the two rows of card images displayed in the program region 22 illustrated in FIG. 4, the lower row is a row of card images indicating the recorded programs. Characters "Terrestrial D recorded" are displayed above the leftmost card image indicating the recorded program.

In some cases, the row of card images indicating the programs whose schedule recording can be set is not displayed in the program region 22 and only the row of card images indicating the recorded programs is displayed in the program region 22.

In a case where the search result screen is displayed, the user can operate the remote controller 4 to select predetermined content and can, for example, view a Web moving image, schedule the recording of a program, play back a recorded program, and download movie content. A card image indicating the content that is being selected is popped up and emphasized as illustrated in the leftmost Web moving image illustrated in FIGS. 3 and 4.

3. First Search Example

Here, an example in which a search is performed on the basis of the entire character string input by the user and a search is performed on the basis of the decomposed character strings forming the character string will be described.

Figure 5:
FIG. 5 is a diagram illustrating an example of syntax analysis.

FIG. 5 is a diagram illustrating an example of syntax analysis.

As illustrated in the upper stage of FIG. 5, for example, in a case where the user utters words "Next week's ○○○○ drama", the cooperation server 2 performs voice recognition and generates a character string "Next week's ○○○○ drama".

It is assumed that "○○○○" is a proper noun and is the name of a person such as the name of an actor. In this example, the user intends to search for the drama in which "○○○○" appears and which will be broadcast next week. The character string "Next week's ○○○○ drama" is transmitted from the cooperation server 2 to the TV 1.

The search application of the TV 1 which has received the character string "Next week's ○○○○ drama" transmitted from the cooperation server 2 further acquires the search results of Web content. The search results of Web content are transmitted from the cooperation server 2 to the TV 1, following the character string indicating the content of the utterance of the user.

The cooperation server 2 searches for a Web moving image and movie content, collectively using the entire character string "Next week's ○○○○ drama", and transmits the search results to the TV 1.

The TV 1 performs control such that a card image indicating the Web moving image obtained as the search result is displayed in the Web moving image region 21 of the search result screen and a card image indicating the movie content is displayed in the movie region 23 of the search result screen.

In addition, the TV 1 performs syntax analysis for the character string "Next week's ○○○○ drama", as represented by an arrow in FIG. 5. A natural language spoken by the user is divided into morphemes which are the smallest meaningful units by the syntax analysis and parts of speech of each morpheme or the like are determined. In addition, for example, the morphemes are combined with each other to generate a decomposed character string with an attribute that is suitable for use in searching for a program.

In the example illustrated in FIG. 5, a decomposed character string "next week" with an attribute "tense", a decomposed character string "○○○○" with an attribute "name", and a decomposed character string "drama" with an attribute "genre" are generated on the basis of the character string "Next week's ○○○○ drama".

The TV 1 sets search conditions on the basis of "next week", "○○○○", and "drama" obtained as the results of the syntax analysis and searches for a program. For example, the search conditions are set such that the program whose genre is drama and which will be broadcast next week on the basis of today is searched. The TV 1 performs control such that a card image indicating the program obtained as the search result is additionally displayed in the program region 22 of the search result screen.

With this configuration, the search result screen including the search results based on the entire character string indicating the content of the utterance of the user and the search results based on the decomposed character strings forming the character string, which has been described with reference to FIGS. 3 and 4, is displayed.

<3-1. Example of Configuration of Each Apparatus>
<3-1-1. Configuration of TV 1>

Figure 6:
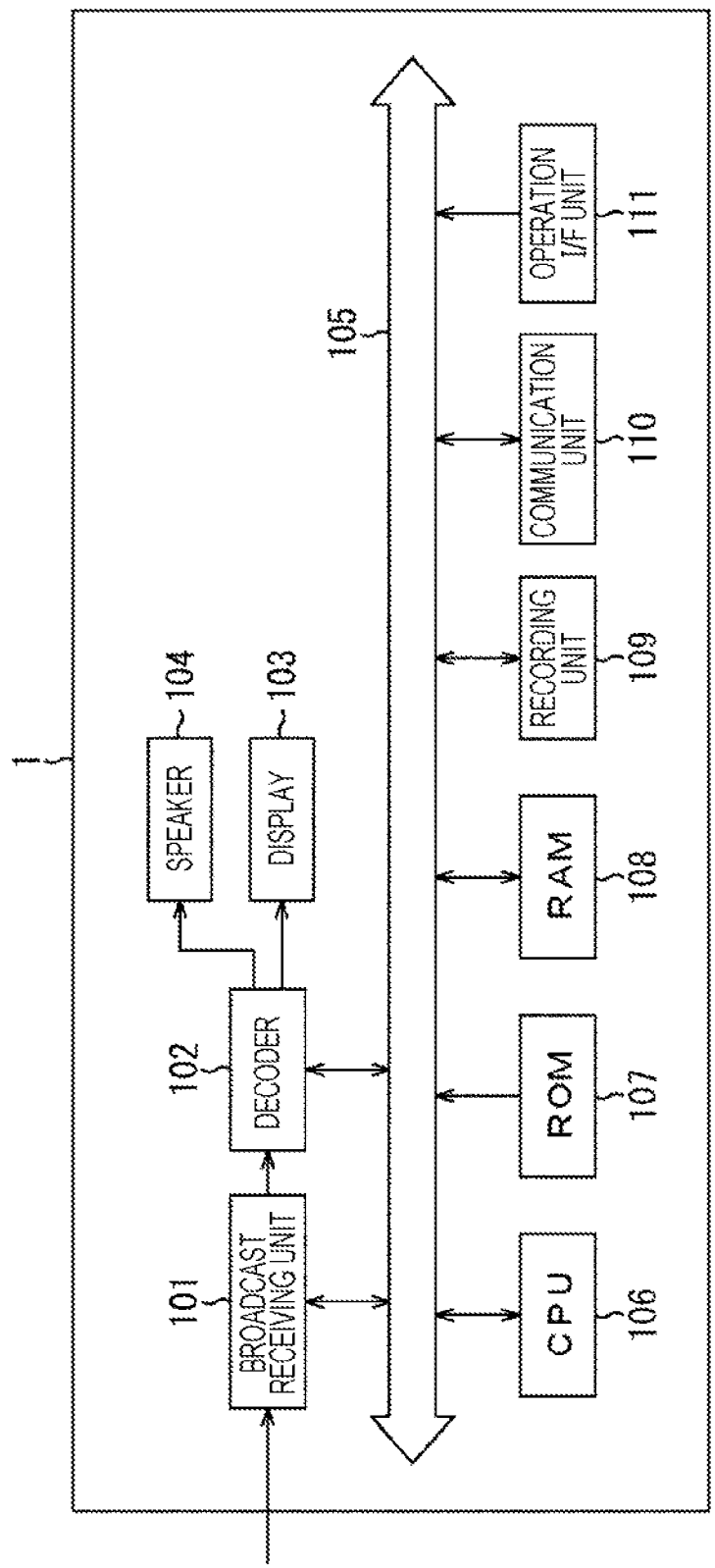
FIG. 6 is a block diagram illustrating an example of the hardware configuration of the TV.

FIG. 6 is a block diagram illustrating an example of the hardware configuration of the TV 1.

A broadcast receiving unit 101 receives a broadcast wave signal supplied from an antenna (not illustrated), performs various types of processing, such as A/D conversion and demodulation, and outputs program data to a decoder 102.

The decoder 102 decodes a video stream forming the program data such that a video of the program is displayed on a display 103 such as a liquid crystal display (LCD) or an organic EL display. In addition, the decoder 102 decodes an audio stream forming the program data such that a voice of the program is output from a speaker 104 in synchronization with the video.

A central processing unit (CPU) 106, a read only memory (ROM) 107, and a random access memory (RAM) 108 are connected to each other by a bus 105. The CPU 106 executes a program recorded on the ROM 107 or a recording unit 109 using the RAM 108 to control the overall operation of the TV 1.

The recording unit 109 is a recording medium such as a hard disk drive (HDD) or a solid state drive (SSD). The recording unit 109 records content, such as a broadcast program, and various types of data, such as EPG data and a program.

A communication unit 110 is an interface of the network 3. The communication unit 110 communicates with the cooperation server 2.

An operation I/F unit 111 receives data transmitted from the remote controller 4 and outputs the data to the CPU 106 through the bus 105.

Figure 7:
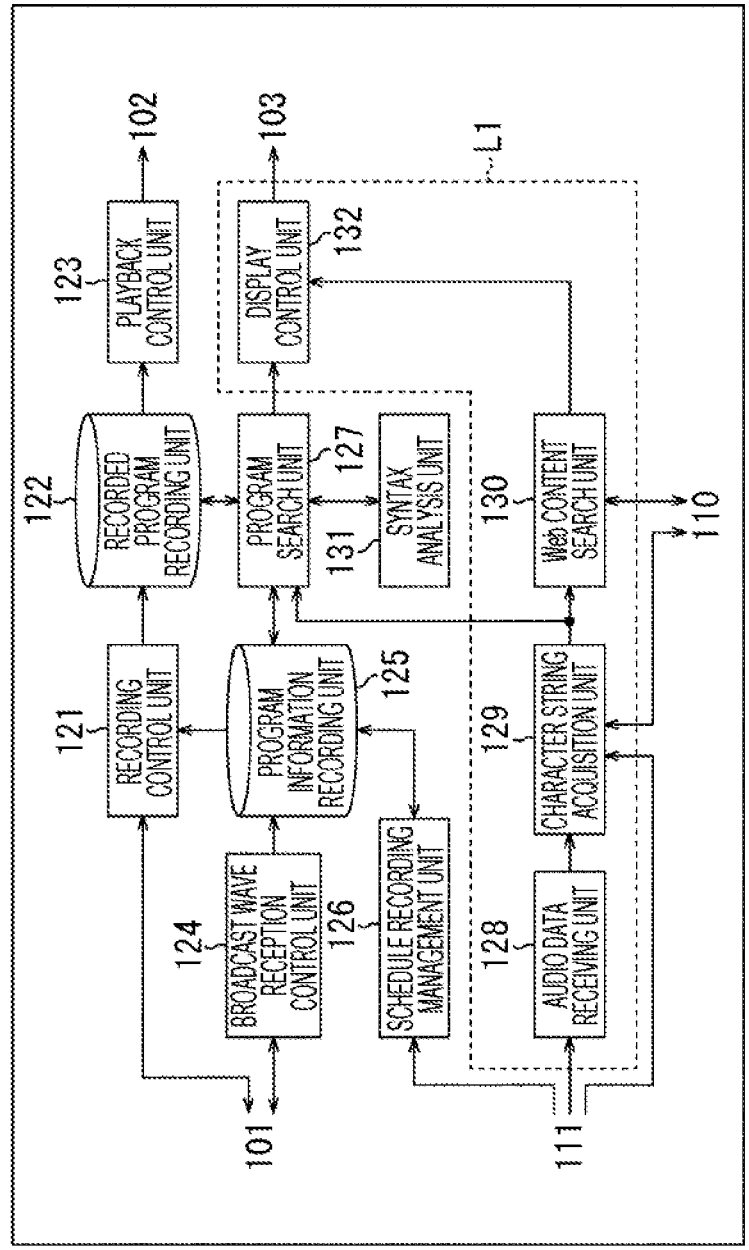
FIG. 7 is a block diagram illustrating an example of the functional configuration of the TV.

FIG. 7 is a block diagram illustrating an example of the functional configuration of the TV 1.

The CPU 106 illustrated in FIG. 6 executes each program illustrated in FIG. 2 to implement at least some of the functional units illustrated in FIG. 7.

In a case where the program whose schedule recording has been set starts to be broadcast with reference to information recorded on a program information recording unit 125, a recording control unit 121 controls the broadcast receiving unit 101 such that data of the program to be recorded is acquired. Information related to the schedule recording of a program is recorded on the program information recording unit 125. The recording control unit 121 outputs the acquired data of the program to a recorded program recording unit 122 such that the recorded program recording unit 122 records the data.

For example, the program recording application is executed to implement the recording control unit 121.

The recorded program recording unit 122 is implemented in the recording unit 109. The recorded program recording unit 122 records the data of the program supplied from the recording control unit 121 and manages the data as a recorded program.

A playback control unit 123 reads the data of a program to which an instruction for playback is given from the recorded programs recorded on the recorded program recording unit 122 and outputs the data to the decoder 102 such that the data is played back.

A broadcast wave reception control unit 124 controls the reception of broadcast waves by the broadcast receiving unit 101. In addition, the broadcast wave reception control unit 124 extracts EPG data from the broadcast wave signal received by the broadcast receiving unit 101 such that the EPG data is recorded on the program information recording unit 125.

For example, the program playback application is executed to implement the playback control unit 123 and the broadcast wave reception control unit 124.

The program information recording unit 125 is implemented in the recording unit 109. The program information recording unit 125 records the EPG data supplied from the broadcast wave reception control unit 124 and information related to schedule recording supplied from a schedule recording management unit 126.

The schedule recording management unit 126 sets the schedule recording of a predetermined program in response to an operation of the user and directs the program information recording unit 125 to record information indicating the content of the program.

For example, the program listing application is executed to implement the schedule recording management unit 126.

A program search unit 127 outputs a character string supplied from a character string acquisition unit 129 to a syntax analysis unit 131 such that the syntax analysis unit 131 performs syntax analysis. The program search unit 127 searches for a program, using the decomposed character strings supplied as the result of the syntax analysis from the syntax analysis unit 131 as search keys.

Specifically, the program search unit 127 searches for a program from the programs that are being broadcast and the programs scheduled to be broadcast, with reference to the EPG data recorded on the program information recording unit 125. In addition, the program search unit 127 searches for the recorded program recorded on the recorded program recording unit 122. The program search unit 127 outputs information related to the searched program to a display control unit 132.

For example, the program search module is executed to implement the program search unit 127.

An audio data receiving unit 128 controls the operation I/F unit 111 such that the audio data indicating the content of the utterance of the user which has been transmitted from the remote controller 4 is received. The audio data receiving unit 128 outputs the received audio data to the character string acquisition unit 129.

The character string acquisition unit 129 controls the communication unit 110 such that the received audio data is transmitted to the cooperation server 2. In addition, the character string acquisition unit 129 acquires a character string transmitted from the cooperation server 2 in response to the transmission of the audio data. The character string acquisition unit 129 outputs the acquired character string to the program search unit 127 and a Web content search unit 130.

In addition, in a case where a character string as a search key is manually input by the user, the operation I/F unit 111 receives the character string transmitted from the remote controller 4 and the character string acquisition unit 129 acquires the character string.

The Web content search unit 130 controls the communication unit 110 such that the search results of Web content transmitted from the cooperation server 2 are acquired. The Web content search unit 130 outputs the search results of the Web content to the display control unit 132.

The TV 1 may transmit a character string to the cooperation server 2 and the cooperation server 2 may search for Web content in response to the transmission of the character string and the cooperation server 2 may transmit the search result to the TV 1. In this case, the Web content search unit 130 transmits the character string supplied from the character string acquisition unit 129 to the cooperation server 2 and acquires the search results of Web content.

The syntax analysis unit 131 performs syntax analysis for the character string supplied from the program search unit 127 and outputs decomposed character strings to the program search unit 127. The syntax analysis unit 131 has information used for natural language processing.

The display control unit 132 performs control such that a search result screen is displayed on the display 103 on the basis of the search result supplied from the program search unit 127 and the search result supplied from the Web content search unit 130.

For example, the search application is executed to implement the audio data receiving unit 128, the character string acquisition unit 129, the Web content search unit 130, and the display control unit 132 surrounded by a dashed line L1.

<3-1-2. Configuration of Cooperation Server 2>

Figure 8:
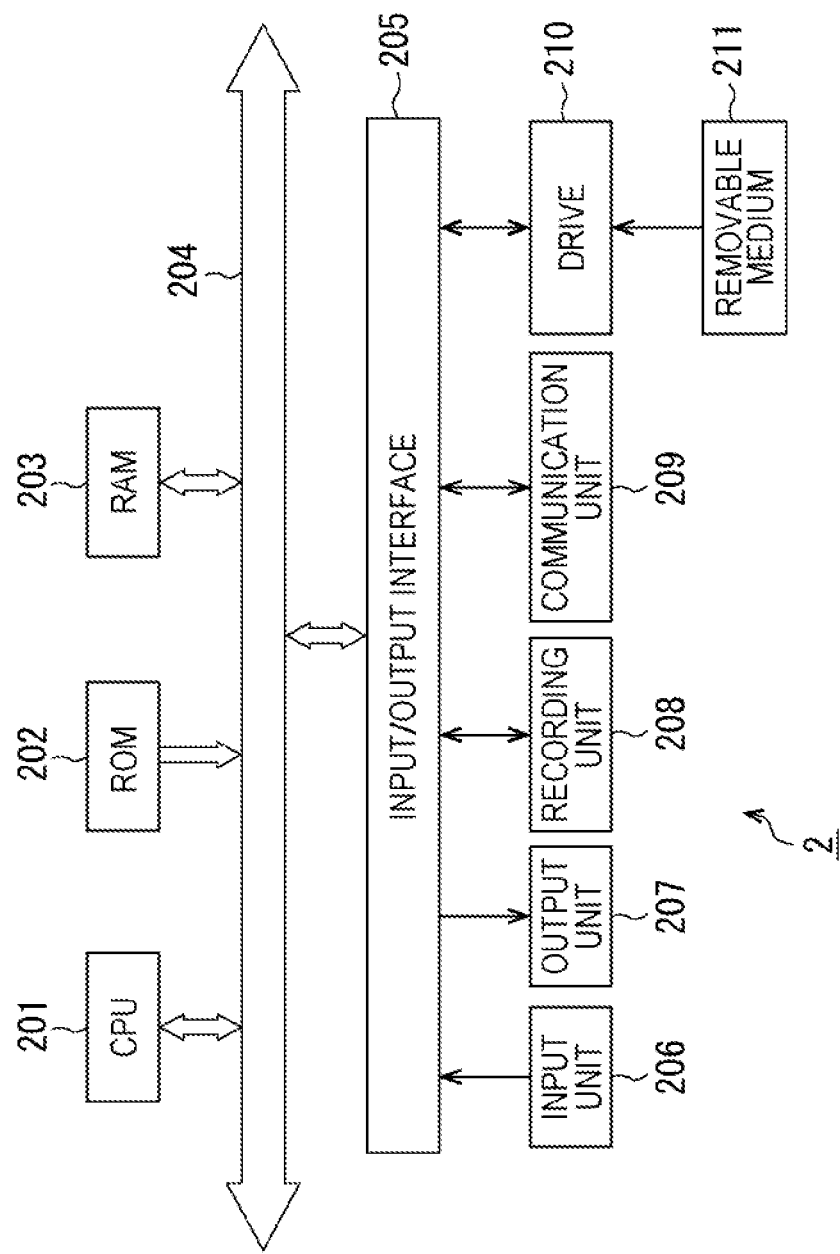
FIG. 8 is a block diagram illustrating an example of the hardware configuration of a cooperation server.

FIG. 8 is a block diagram illustrating an example of the hardware configuration of the cooperation server 2.

A CPU 201, a ROM 202, and a RAM 203 are connected to each other by a bus 204. In addition, an input/output interface 205 is connected to the bus 204.

An input unit 206 including, for example, a keyboard and a mouse and an output unit 207 including, for example, a display and a speaker are connected to the input/output interface 205. In addition, a recording unit 208, such as a hard disk or a non-volatile memory, a communication unit 209 that is, for example, a network interface and communicates with the TV 1, and a drive 210 that drives a removable medium 211 are connected to the input/output interface 205.

Figure 9:
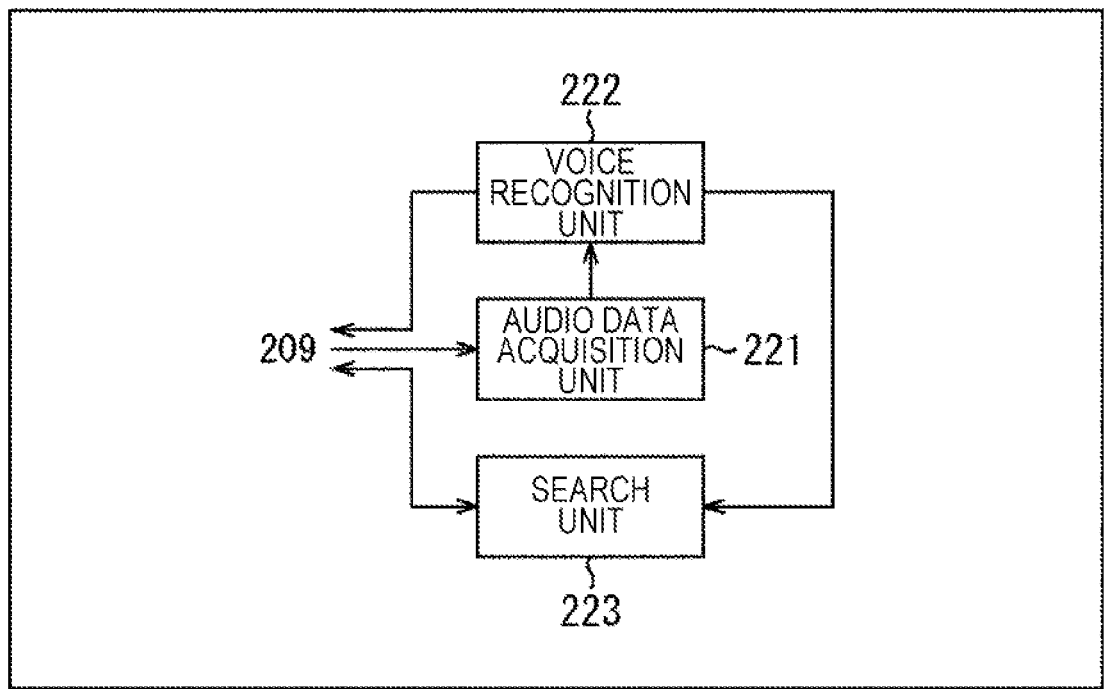
FIG. 9 is a block diagram illustrating an example of the functional configuration of the cooperation server.

FIG. 9 is a block diagram illustrating an example of the functional configuration of the cooperation server 2.

The CPU 201 illustrated in FIG. 8 executes a predetermined program to implement at least some of the functional units illustrated in FIG. 9. In the cooperation server 2, an audio data acquisition unit 221, a voice recognition unit 222, and a search unit 223 are implemented.

The audio data acquisition unit 221 controls the communication unit 209 to acquire the audio data transmitted from the TV 1. The audio data acquisition unit 221 outputs the acquired audio data to the voice recognition unit 222.

The voice recognition unit 222 performs voice recognition for the audio data supplied from the audio data acquisition unit 221. The voice recognition unit 222 controls the communication unit 209 such that a character string indicating the content of the utterance of the user is transmitted to the TV 1. In addition, the voice recognition unit 222 outputs the character string indicating the content of the utterance of the user to the search unit 223.

The search unit 223 searches for Web content on the basis of the character string transmitted from the voice recognition unit 222 or the character string appropriately transmitted from the TV 1. The data of various types of content, such as the data of a Web moving image distributed by a moving image distribution service provided by the cooperation server 2 and movie content transmitted by a content sales service provided by the cooperation server 2, is recorded on the recording unit 208. The search unit 223 controls the communication unit 209 such that the search results are transmitted to the TV 1.

In this example, the functions of the cooperation server 2 are implemented by one computer. However, the functions of the cooperation server 2 may be dispersively implemented by a plurality of computers. In a case where the functions of the cooperation server 2 are dispersively implemented by a plurality of computers, each configuration illustrated in FIG. 9 is implemented by the plurality of computers and the processes are cooperatively performed.

<3-2. Example of Operation of Information Processing System>

Here, the operation of the TV 1 and the cooperation server 2 having the above-mentioned configurations will be described with reference to a sequence diagram illustrated in FIG. 10.

For example, in a case where the microphone collects the user's voice "Next week's ○○○○ drama", in step S1, the remote controller 4 transmits the collected audio data to the TV 1.

In step S11, the audio data receiving unit 128 of the TV 1 receives the audio data transmitted from the remote controller 4. The received audio data is supplied to the character string acquisition unit 129.

In step S12, the character string acquisition unit 129 transmits the audio data to the cooperation server 2.

In step S51, the audio data acquisition unit 221 of the cooperation server 2 receives the audio data transmitted from the TV 1. The received audio data is supplied to the voice recognition unit 222.

In step S52, the voice recognition unit 222 performs voice recognition on the basis of the audio data to generate a character string indicating the content of the utterance of the user. The character string obtained by the voice recognition is supplied to the search unit 223.

In step S53, the voice recognition unit 222 transmits the character string obtained by the voice recognition to the TV 1.

The search unit 223 searches for Web content on the basis of the entire character string obtained by the voice recognition in step S54 and transmits the search result to the TV 1 in step S55.

In step S13, the character string acquisition unit 129 of the TV 1 receives the character string transmitted from the cooperation server 2 in step S53. In addition, in step S14, the Web content search unit 130 of the TV 1 receives the search results transmitted from the cooperation server 2 in step S55. The search results received by the Web content search unit 130 are supplied to the display control unit 132.

In step S15, the character string acquisition unit 129 outputs the character string transmitted from the cooperation server 2 to the program search unit 127.

In step S16, the display control unit 132 performs control such that the search result screen on which card images indicating the searched Web content are arranged side by side is displayed on the display 103 on the basis of the search results supplied from the Web content search unit 130. In this case, card images indicating the searched Web moving images are displayed in the Web moving image region 21 and card images indicating movie content are displayed in the movie region 23.

The program search unit 127 receives the character string supplied from the character string acquisition unit 129 in step S31 and outputs the character string to the syntax analysis unit 131 in step S32.

The syntax analysis unit 131 receives the character string supplied from the program search unit 127 in step S41 and performs syntax analysis in step S42.

In step S43, the syntax analysis unit 131 outputs decomposed character strings acquired as the result of the syntax analysis to the program search unit 127 together with the attribute information of each decomposed character string.

The program search unit 127 receives the information supplied from the syntax analysis unit 131 in step S33 and searches for a program from the programs that are being broadcast, the programs scheduled to be broadcast, and the recorded programs on the basis of the decomposed character strings in step S34. For example, search conditions are set by the decomposed character strings and a program is searched.

In step S35, the program search unit 127 outputs information related to the searched program to the display control unit 132 together with information for specifying an application that starts in a case in which each program is selected. For example, for the searched program that is being broadcast and the searched program scheduled to be broadcast, information indicating the program listing application is output as an application that starts in a case in which the programs are selected. In addition, for the searched recorded program, information indicating the program playback application is output as an application that starts in a case in which the program is selected.

The display control unit 132 receives the information supplied from the program search unit 127 in step S17 and performs controls such that a card image of the searched program is added and displayed on the search result screen in step S18.

With this configuration, a row of card images indicating the programs that are being broadcast and the programs scheduled to be broadcast or/and a row of card images indicating the recorded programs are displayed in the program region 22 in addition to the display of the Web moving image region 21 and the movie region 23. Then, a series of processes for displaying the search result screen ends.

In a case where the user selects one of the card images indicating the programs that are being broadcast and the programs scheduled to be broadcast, which are displayed in the program region 22, the program listing application starts and, for example, the detailed information of the program is displayed. Then, the schedule recording management unit 126 sets the schedule recording of the selected program.

In addition, in a case where the user selects one of the card images indicating the recorded programs displayed in the program region 22, the program playback application starts and the data of the selected recorded program is read from the recorded program recording unit 122. The read data is supplied to the playback control unit 123 and the recorded program starts to be played back.

The information of Web content searched on the basis of the entire character string input by the user and the information of the program searched on the basis of the decomposed character strings forming the character string are displayed on one search result screen by the above-mentioned series of processes.

Among the programs to be searched, some programs are not found in a case where a search is performed using the entire character string and are found in a case where a search is performed using the decomposed character strings. In addition, in a case where a program is searched using the entire character string, a program which is not related to "○○○○" that the user is looking for may be searched on the basis of on a character string other than "○○○○".

Since a search is performed using the decomposed character strings, it is possible to search for a program with high accuracy according to the intention of the user.

In this embodiment, a program is searched using the decomposed character strings. However, Web content may be searched using the decomposed character strings.

Figure 10:
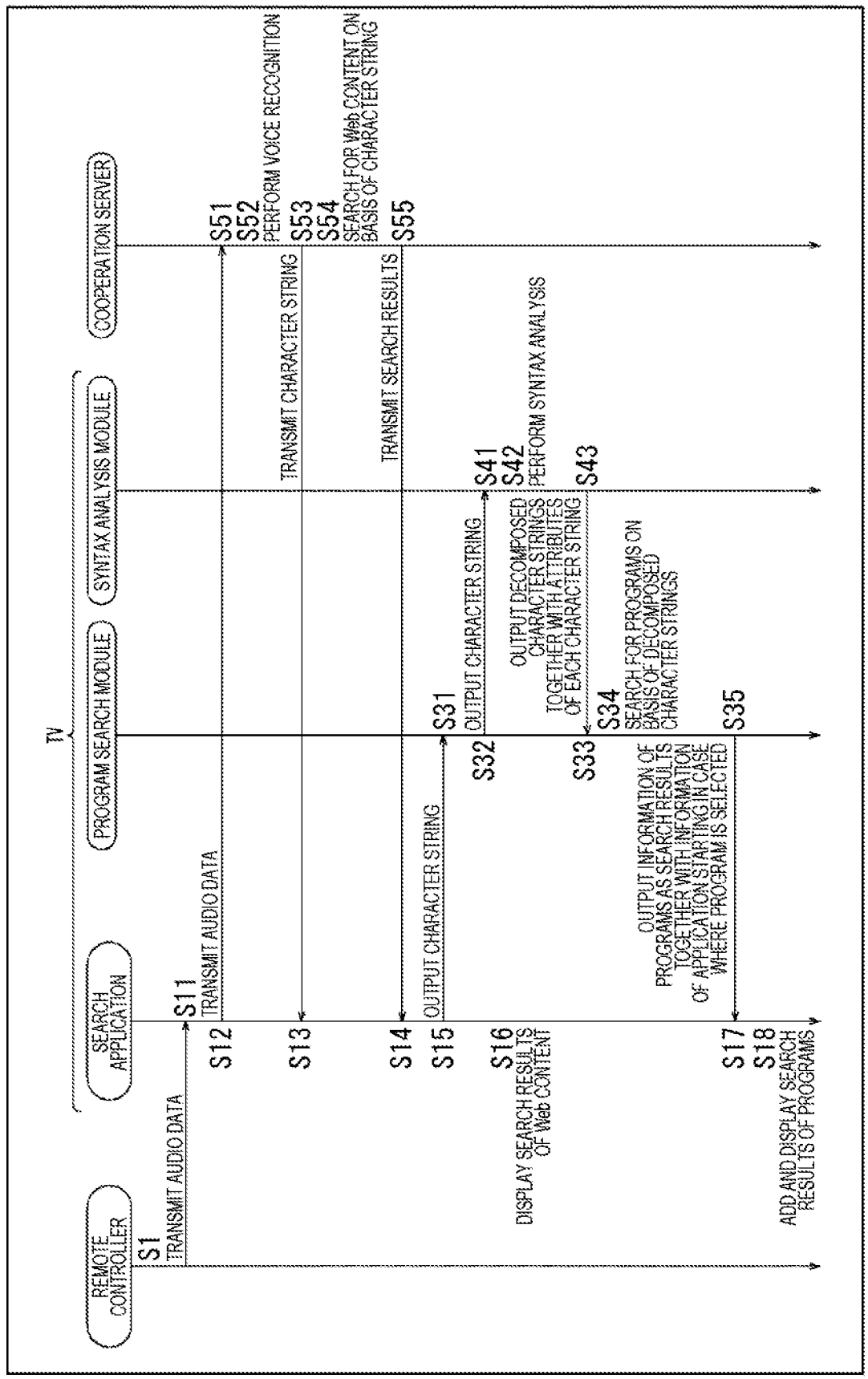
FIG. 10 is a sequence diagram illustrating an operation of an information processing system.

In addition, the process in each step described with reference to FIG. 10 is appropriately performed in parallel to the processes in other steps or before and after the processes in other steps. This is similar to processes in sequence diagrams which will be described below.

4. Second Search Example

In some cases, it is possible to specify whether or not the user intends to search for a program from the programs that are being broadcast and the programs scheduled to be broadcast and to set the schedule recording of the program or the user intends to search for a program from the recorded programs and to view the program, on the basis of the content of the utterance of the user.

In a case where the intention of the user is specified, a method for presenting the search result and the flow of screen display may be switched according to the intention of the user.

Figure 11:
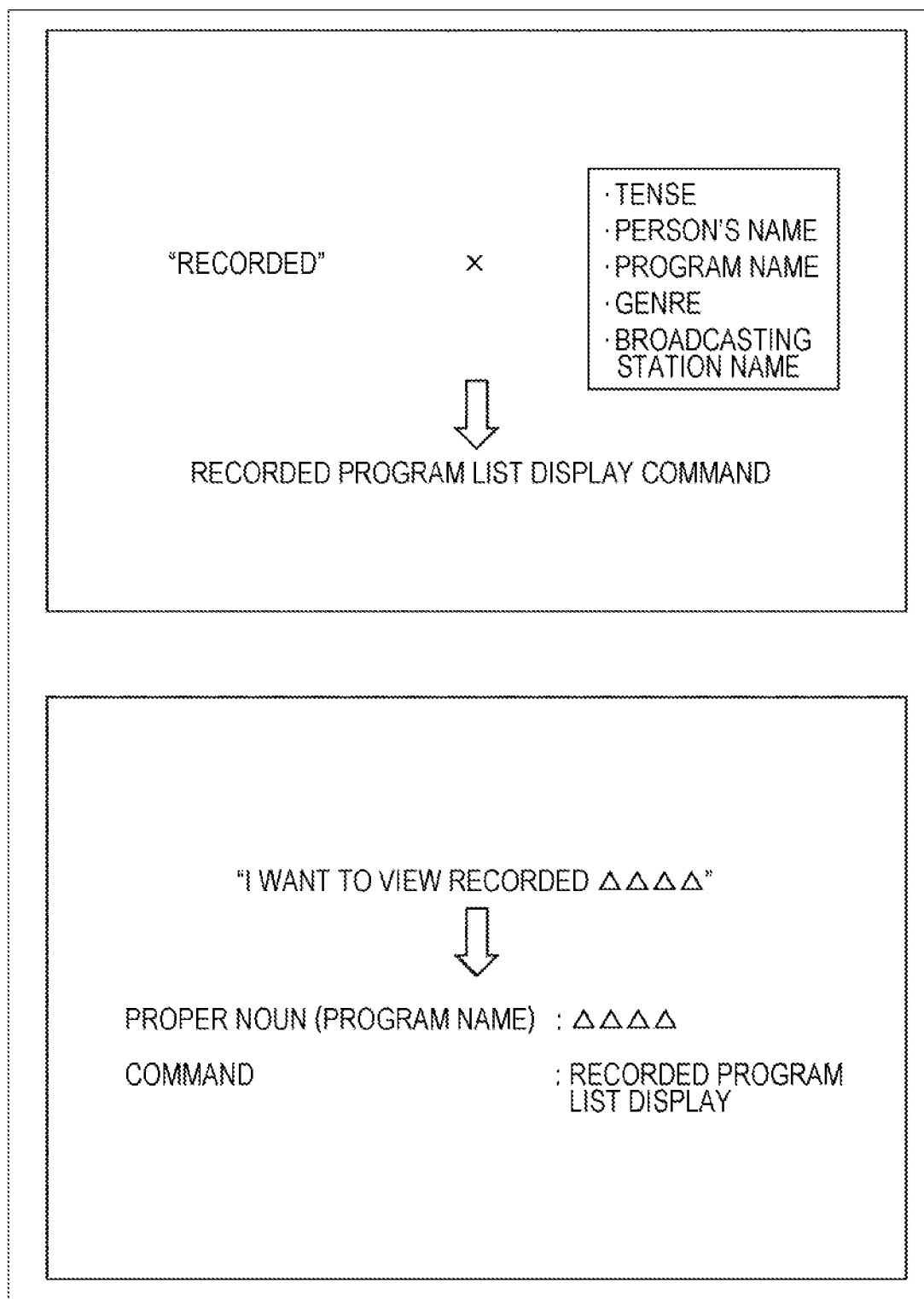
FIG. 11 is a diagram illustrating an example of the specification of the intention of a user.

FIGS. 11 and 12 are diagrams illustrating an example of the specification of the intention of the user.

In a case where the user utters a word with a specific attribute following a word "recorded" as illustrated in an upper stage of FIG. 11, it is specified that the user intends to view a recorded program which is related to the word uttered after the word "recorded". In this example, in a case where the user utters a word with at least one of attributes "tense", "person's name", "program name", "genre", or "broadcasting station name" following the word "recorded", the intention of the user is specified.

In a case where syntax analysis is performed for a character string indicating the content of the utterance of the user to detect that the user has uttered a word with a specific attribute following the word "recorded", a recorded program list display command is output from the syntax analysis unit 131 to the program search unit 127 as represented by an arrow. The recorded program list display command is a command to display the search results of the recorded program.

The program search unit 127 that has received the recorded program list display command searches for a program from only the recorded programs. A recorded program searched on the basis of the decomposed character strings is displayed as the search result on the search result screen, following the word "recorded", and the program that is being broadcast and the program scheduled to be broadcast are not displayed.

For example, in a case where the user utters a character string "I want to view the recorded ΔΔΔΔ" as illustrated in a lower stage of FIG. 11, the syntax analysis unit 131 performs syntax analysis for the character string and both a word "ΔΔΔΔ" with the attribute "program name" and the recorded program list display command are supplied to the program search unit 127. Here, it is assumed that "ΔΔΔΔ" is a proper noun indicating a program name.

The program search unit 127 searches for programs from only the recorded programs on the basis of "ΔΔΔΔ". The search results of the recorded programs having the "ΔΔΔΔ" as the "program name" are displayed on the program search screen.

In a case where the user utters any one of the words "schedule", "record", and "schedule recording" following the word with a specific attribute as illustrated in an upper stage of FIG. 12, it is specified that the user intends to set the schedule recording of the program that is being broadcast and the program scheduled to be recorded, which are related to the word uttered before, for example, the word "schedule". In this example, in a case where the user utters, for example, the word "schedule" following a word with at least one of the attributes "tense", "person's name", "program name", "genre", or "broadcasting station name", the intention of the user is specified.

In addition, in a case where the user utters words "schedule and", the similar process as that in a case where the user utters the word "schedule" is performed. Further, in a case where the user utters words "record and", the similar process as that in a case where the user utters the word "record" is performed.

In a case where syntax analysis is performed for a character string indicating the content of the utterance of the user to detect that the user has uttered, for example, the word "schedule" following a word with a specific attribute, a schedule recording setting command is output from the syntax analysis unit 131 to the program search unit 127 as represented by an arrow. The schedule recording setting command is a command to display search results of the programs that are being broadcast and the programs scheduled to be broadcast, of which the schedule recording can be set.

The program search unit 127 that has received the schedule recording setting command searches for a program from only the programs that are being broadcast and the programs scheduled to be broadcast. The programs that are being broadcast and the programs scheduled to be broadcast, which have been searched on the basis of the decomposed character strings before, for example, the word "schedule", are displayed as the search results on the search result screen and no recorded programs are displayed.

For example, in a case where the user utters a character string "Record next week's ○○○○ drama" as illustrated in a lower stage of FIG. 12, the syntax analysis unit 131 performs syntax analysis for the character string. In addition, a decomposed character string "next week" with an attribute "tense", a decomposed character string "○○○○" with an attribute "person's name", and a decomposed character string "drama" with an attribute "genre" as the result of the syntax analysis and the schedule recording setting command are supplied to the program search unit 127.

The program search unit 127 searches for programs from only the "drama" programs to be broadcast "next week" on the basis of "○○○○". The search results of the programs in which "○○○○" appears are displayed on the program search screen.

As such, the TV 1 can specify the intention of the user from the uttered content and change a method for presenting the search result.

That is, in a case where the user intends to search for a program from the programs that are being broadcast and the programs scheduled to be broadcast and to set the schedule recording of the program, the search range is refined and the search results of the programs that are being broadcast and the programs scheduled to be broadcast are displayed. In addition, in a case where the user intends to search for a program from the recorded programs and to view the program, the search range is refined and the search results of the recorded programs are displayed.

This configuration in which a method for presenting the search results is changed makes it possible to display the search result screen that is intuitive and easy to understand for the user.

<4-1. Example of Screen Transition>

Figure 13:
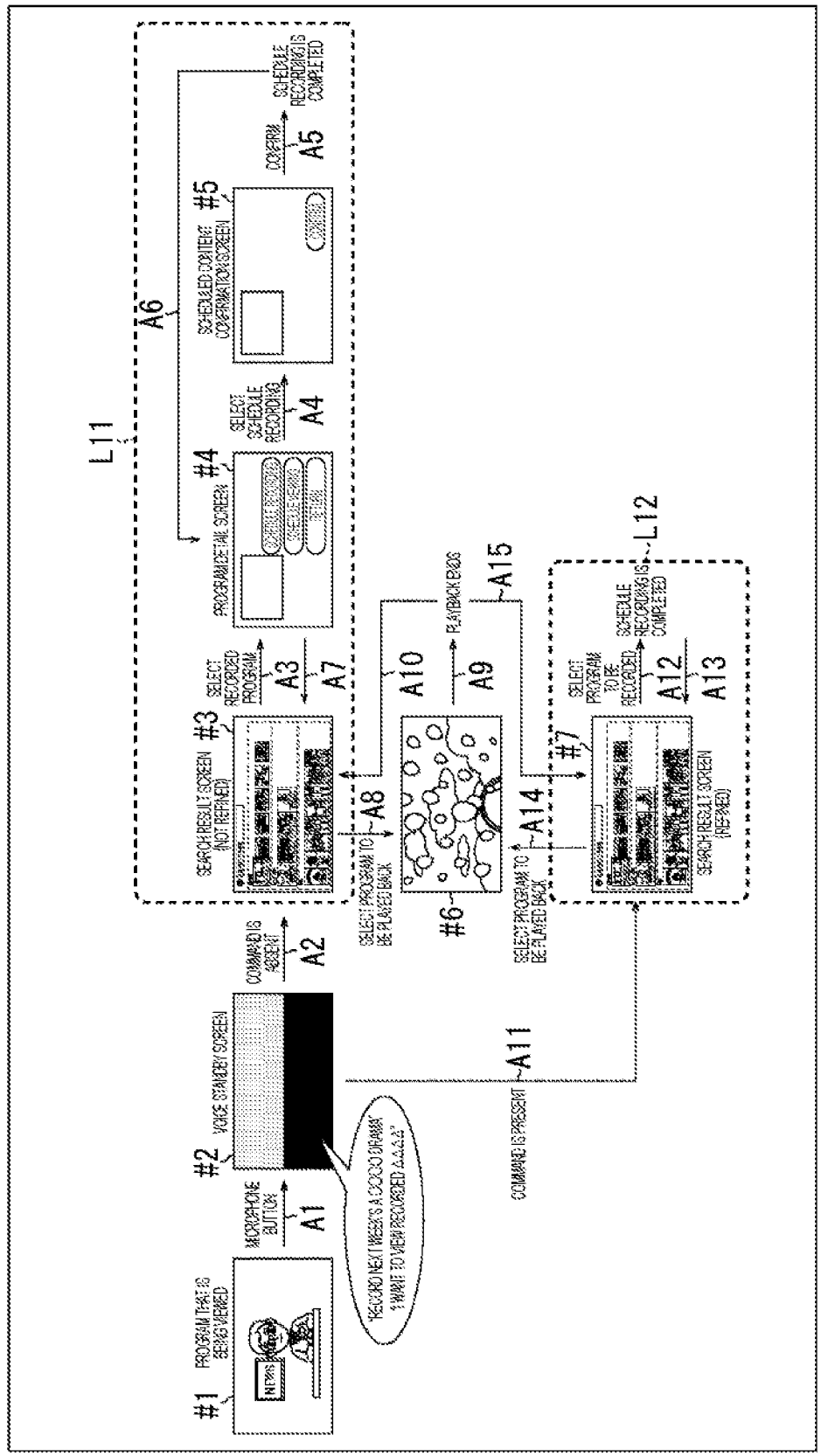
FIG. 13 is a diagram illustrating an example of the flow of screen display.

FIG. 13 is a diagram illustrating an example of the flow of screen display.

Screen #1 illustrated at the left end of FIG. 13 is a screen of a program that is being viewed. For example, in a case where the user presses the microphone button of the remote controller 4 in this state, the TV 1 is changed to a state in which it waits for the input of the user's voice as represented by an arrow A1. The display of the display 103 is switched to screen #2 which is a voice standby screen.

The audio data transmitted from the remote controller 4 is transmitted to the cooperation server 2 and the character string indicating the content of the utterance of the user is acquired. In addition, syntax analysis is performed for the character string transmitted from the cooperation server 2 in the TV 1 and decomposed character strings are acquired. The recorded program list display command or the schedule recording setting command is appropriately output from the syntax analysis unit 131 to the program search unit 127 according to the content of the decomposed character strings.

In a case where the recorded program list display command or the schedule recording setting command is not included in the result of the syntax analysis output from the syntax analysis unit 131, the display of the display 103 is switched to search result screen #3 in which the program search range has not been refined, as represented by an arrow A2. The search result screen #3 is similar to the screen that has been described with reference to FIG. 4 and includes the search results of the programs that are being broadcast, the programs scheduled to be broadcast, and the recorded programs.

In a case where a predetermined program is selected from the programs that are being broadcast and the programs scheduled to be broadcast on the search result screen #3, the display of the display 103 is switched to program detail screen #4 as represented by an arrow A3. The program detail screen #4 is a screen that includes detailed information such as the content and broadcasting date and time of the program selected by the user. The program detail screen #4 is displayed on the basis of, for example, the EPG recorded on the program information recording unit 125.

For example, a schedule recording button that is operated to set the schedule recording of the program whose detailed information is being displayed, a schedule viewing button that is operated to schedule viewing, and a return button that is operated to return to the search result screen #3 are displayed on the program detail screen #4.

For example, in a case where the schedule recording button is operated, the display of the display 103 is switched to scheduled content confirmation screen #5 as represented by an arrow A4. For example, scheduled content and a confirmation button that is operated to confirm the schedule are displayed on the scheduled content confirmation screen #5.

In a case where the confirmation button is operated, the schedule recording of the program is completed and information indicating the content of the program is recorded on the program information recording unit 125 as represented by an arrow A5. The display of the display 103 is switched to the program detail screen #4 as represented by an arrow A6. In a case where the return button is operated on the program detail screen #4, the display of the display 103 returns to the search result screen #3 as represented by an arrow A7.

In a case where a predetermined recorded program is selected on the search result screen #3, the display of the display 103 is switched to program playback screen #6 as represented by an arrow A8. The data of the recorded program is read from the recorded program recording unit 122 and the recorded program is played back by the playback control unit 123.

In a case where the playback of the program ends as represented by an arrow A9, the display of the display 103 returns to the search result screen #3 as represented by an arrow A10.

In a case where the recorded program list display command or the schedule recording setting command is not included in the result of the syntax analysis output from the syntax analysis unit 131, the display of the display 103 at the time of the setting of schedule recording is switched as surrounded by a dashed line L11.

In contrast, in a case where the recorded program list display command or the schedule recording setting command is included in the result of the syntax analysis output from the syntax analysis unit 131, the display of the display 103 is switched to search result screen #7 in which the program search range has been refined as represented by an arrow A11.

The search result screen #7 is a screen including the search results of the recorded programs in a case where the recorded program list display command is output and is a screen including the search results of the programs that are being broadcast and the programs scheduled to be broadcast in a case where the schedule recording setting command is output.

In a case where the command output from the syntax analysis unit 131 is the schedule recording setting command and a predetermined program is selected from the programs that are being broadcast and the programs scheduled to be broadcast on the search result screen #7, the schedule recording of the program is completed and information indicating the content of the program is recorded on the program information recording unit 125 as represented by an arrow A12. That is, in this case, since it is specified that the user intends to set the schedule recording of the program, for example, the program detail screen #4 is not displayed.

As represented by an arrow A13, the search result screen #7 is continuously displayed on the display 103 even while the program is scheduled. The user can successively set the schedule recording of a plurality of programs only by selecting a program from a list of the programs that are being broadcast and the programs scheduled to be broadcast on the search result screen #7.

In a case where the command output from the syntax analysis unit 131 is the recorded program list display command and a predetermined recorded program is selected on the search result screen #7, the display of the display 103 is switched to the program playback screen #6 as represented by an arrow A14. The data of the recorded program is read from the recorded program recording unit 122 and the recorded program is played back by the playback control unit 123.

In a case where the playback of the program ends, the display of the display 103 returns to the search result screen #7 as represented by an arrow A15.

As such, in a case where the schedule recording setting command is included in the result of the syntax analysis output from the syntax analysis unit 131, the display of the display 103 at the time of the setting of schedule recording is switched as surrounded by a dashed line L12.

In particular, since the display of the screen until schedule recording is set is switched according to the intention of the user specified from the uttered content as described above, the user can easily set the schedule recording of the programs listed as the search results.

<4-2. Example of Operation of Information Processing System>

Here, the operation of the TV 1 and the cooperation server 2 implementing the screen display illustrated in FIG. 13 will be described with reference to a sequence diagram illustrated in FIG. 14.

Figure 14:
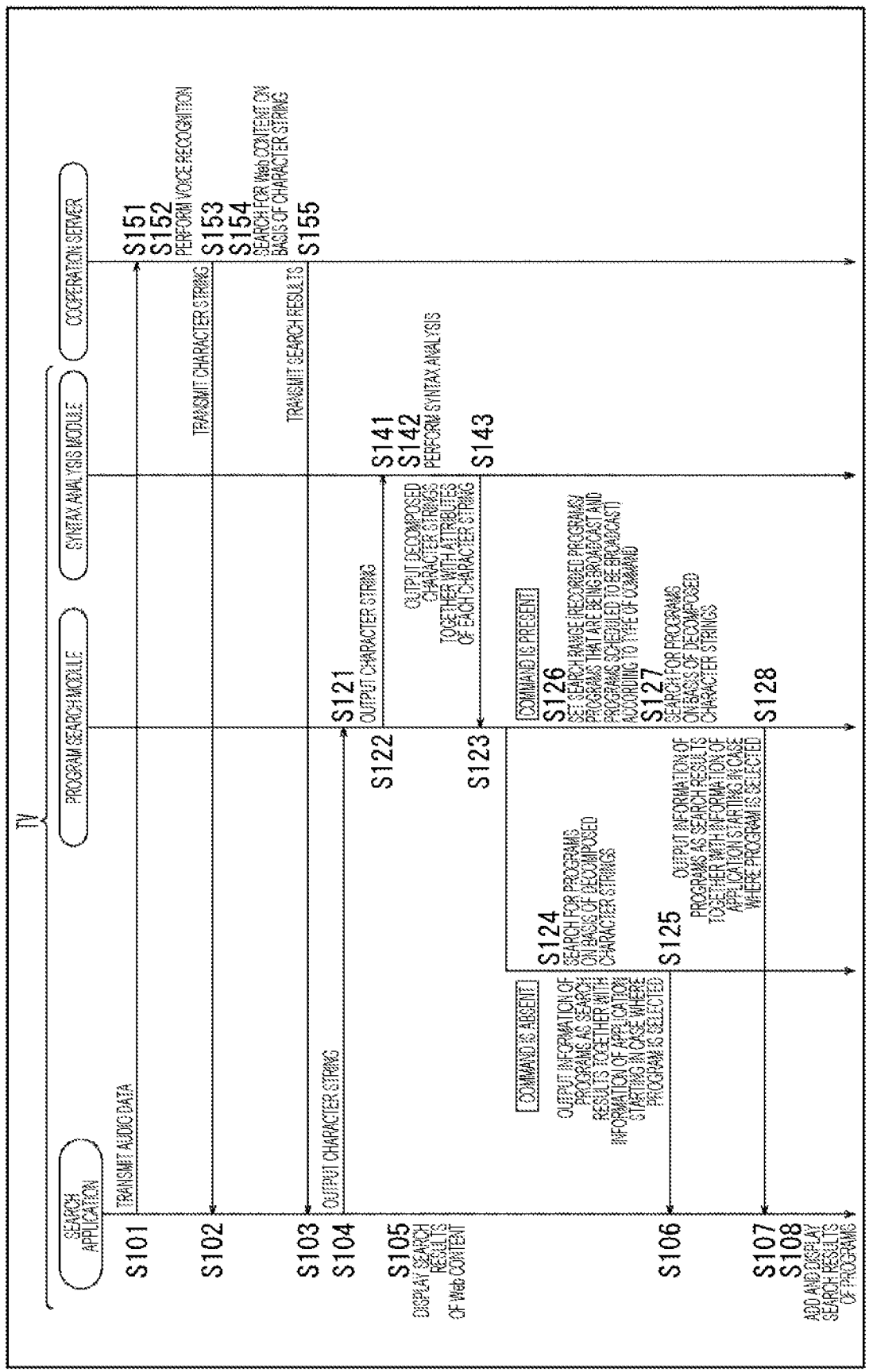
FIG. 14 is a sequence diagram illustrating another operation of the information processing system.

The process illustrated in FIG. 14 starts in a case where the TV 1 receives audio data transmitted from the remote controller 4. In addition, a process in steps S101 to S105, S121 to S123, and S141 to 143 in the TV 1 illustrated in FIG.

14 is similar to the process in steps S12 to S16, S31 to S33, and S41 to 43 illustrated in FIG. 10, respectively. Further, a process in steps S151 to S155 in the cooperation server 2 illustrated in FIG. 14 is similar to the process in steps S51 to S55 illustrated in FIG. 10. The description of overlapping content will be appropriately omitted.

In step S101, the character string acquisition unit 129 of the TV 1 transmits the audio data, which has been transmitted from the remote controller 4 and then received by the audio data receiving unit 128, to the cooperation server 2.

In step S151, the audio data acquisition unit 221 of the cooperation server 2 receives the audio data transmitted from the TV 1.

In step S152, the voice recognition unit 222 performs voice recognition to generate a character string indicating the content of the utterance of the user.

In step S153, the voice recognition unit 222 transmits the character string obtained by the voice recognition to the TV 1.

The search unit 223 searches for Web content on the basis of the entire character string obtained by the voice recognition in step S154 and transmits the search result to the TV 1 in step S155.

In step S102, the character string acquisition unit 129 of the TV 1 receives the character string transmitted from the cooperation server 2 in step S153. In addition, in step S103, the Web content search unit 130 of the TV 1 receives the search results transmitted from the cooperation server 2 in step S155.

In step S104, the character string acquisition unit 129 outputs the character string transmitted from the cooperation server 2 to the program search unit 127.

In step S105, the display control unit 132 performs control such that the search result screen, on which card images indicating Web content are arranged side by side, is displayed on the display 103 on the basis of the search results supplied from the Web content search unit 130.

Meanwhile, the program search unit 127 receives the character string supplied from the character string acquisition unit 129 in step S121 and outputs the character string to the syntax analysis unit 131 in step S122.

The syntax analysis unit 131 receives the character string supplied from the program search unit 127 in step S141 and performs syntax analysis in step S142. The syntax analysis unit 131 detects whether or not the user utters a word with a specific attribute following the word "recorded" or utters a word "schedule" following a word with a specific attribute, on the basis of the result of the syntax analysis.

In step S143, the syntax analysis unit 131 outputs the decomposed character strings acquired as the result of the syntax analysis to the program search unit 127 together with the attribute information of each decomposed character string. The transmitted result of the syntax analysis includes the recorded program list display command in a case where it is detected that a word with a specific attribute is uttered following the word "recorded". In addition, the transmitted result of the syntax analysis includes the schedule recording setting command in a case where it is detected that, for example, the word "schedule" is uttered following a word with a specific attribute.

In step S123, the program search unit 127 receives the information supplied from the syntax analysis unit 131.

In a case where the recorded program list display command or the schedule recording setting command is not included in the received information, in step S124, the program search unit 127 searches for a program from the programs that are being broadcast, the programs scheduled to be broadcast, and the recorded programs on the basis of the decomposed character strings.

In step S125, the program search unit 127 outputs information related to the searched programs to the display control unit 132 together with information for specifying applications that start in a case where each program is selected.

In contrast, in a case where the recorded program list display command or the schedule recording setting command is included in the received information, in step S126, the program search unit 127 sets the program search range according to the type of command. In a case where the command supplied from the syntax analysis unit 131 is the recorded program list display command, the recorded programs are set as the search range. In a case where the command is the schedule recording setting command, the programs that are being broadcast and the programs scheduled to be broadcast are set as the search range.

In step S127, the program search unit 127 searches for a program from the programs in the set search range on the basis of the decomposed character strings.

In step S128, the program search unit 127 outputs information related to the searched programs to the display control unit 132 together with information for specifying applications that start in a case where each program is selected.

In step S106, the display control unit 132 receives the search results output in step S125. In step S107, the display control unit 132 receives the search results output in step S128.

In step S108, the display control unit 132 performs control such that the card images of the searched programs are added and displayed on the search result screen. For example, in a case where the syntax analysis unit 131 outputs the recorded program list display command, a row of the recorded programs is added to the program region 22 and is then displayed. In a case where the syntax analysis unit 131 outputs the schedule recording setting command, a row of the programs that are being broadcast and the programs scheduled to be broadcast is added to the program region 22 and is then displayed. Then, the screen display is switched as described with reference to FIG. 13.

As described above, in a case where a voice search is performed to view the recorded programs, only the recorded programs are displayed as the search results. Therefore, the user can easily select a program to view.

In addition, in a case where a voice search is performed to set the schedule recording of the programs that are being broadcast and the programs scheduled to be broadcast, only the programs that are being broadcast and the programs scheduled to be broadcast are displayed as the search results. Therefore, the user can easily select a program to record. In a case where the user selects a program to record, for example, a detail screen is not displayed and schedule recording is directly set. Therefore, the user can easily set the schedule recording of a program.

<4-3. Other Display Examples>

Figure 15:
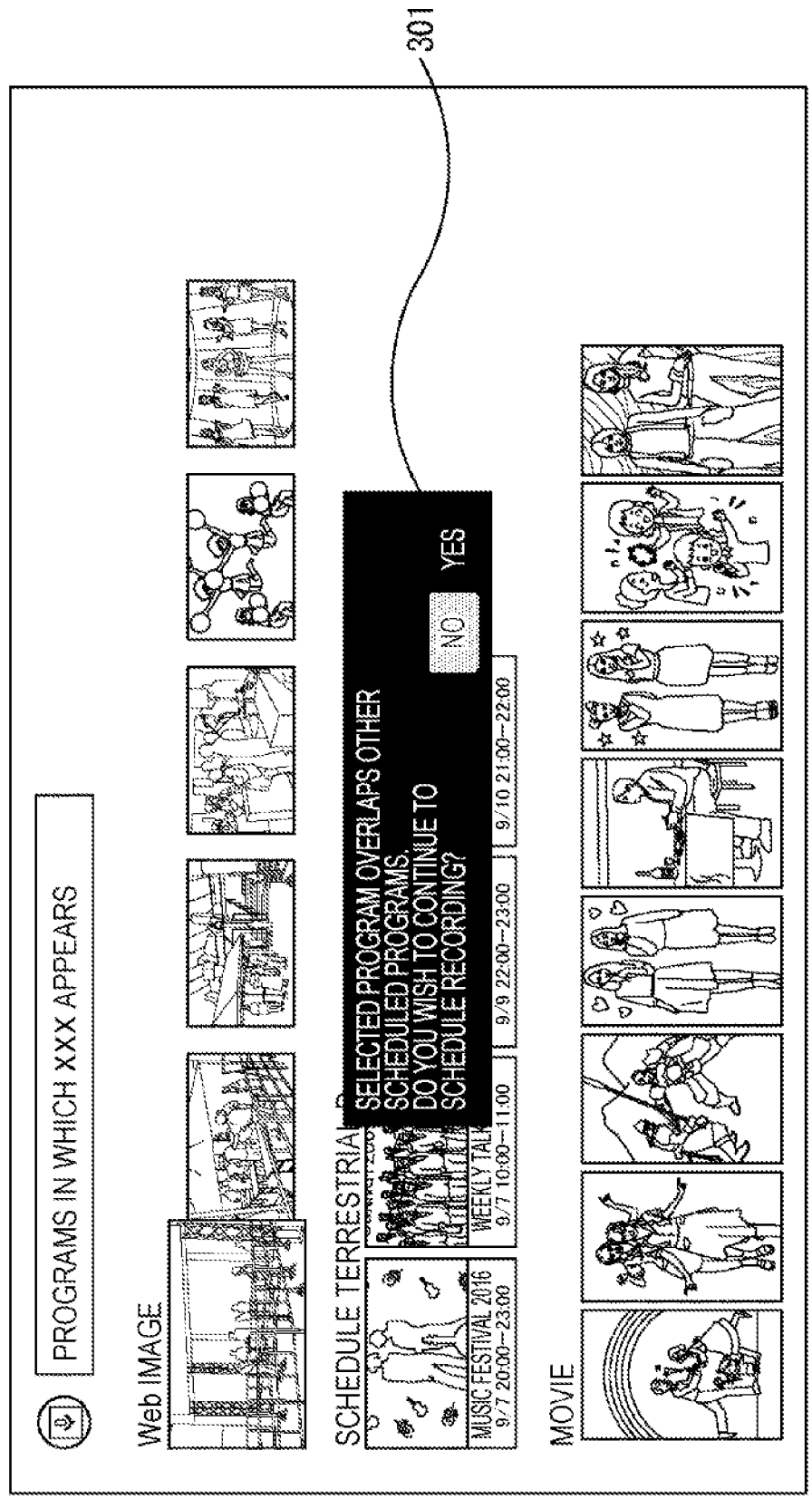
FIG. 15 is a diagram illustrating an example of the search result screen.

In a case where the schedule recording of another program, whose broadcasting time overlaps the broadcasting time of a program selected for schedule recording, has been set, a dialog box 301 for providing notification of the fact is displayed on the search result screen as illustrated in FIG. 15.

A button that is operated in a case where the user selects not to set the schedule recording of the selected program and a button that is operated in a case where the schedule recording of the selected program is set are displayed in the dialog box 301 illustrated in FIG. 15.

The display of the dialogue box enables the user to confirm that the schedule recording of another program whose broadcasting time overlaps has already been set even in a case where a program detail screen or a screen for confirming scheduled content is not displayed.

Figure 16:
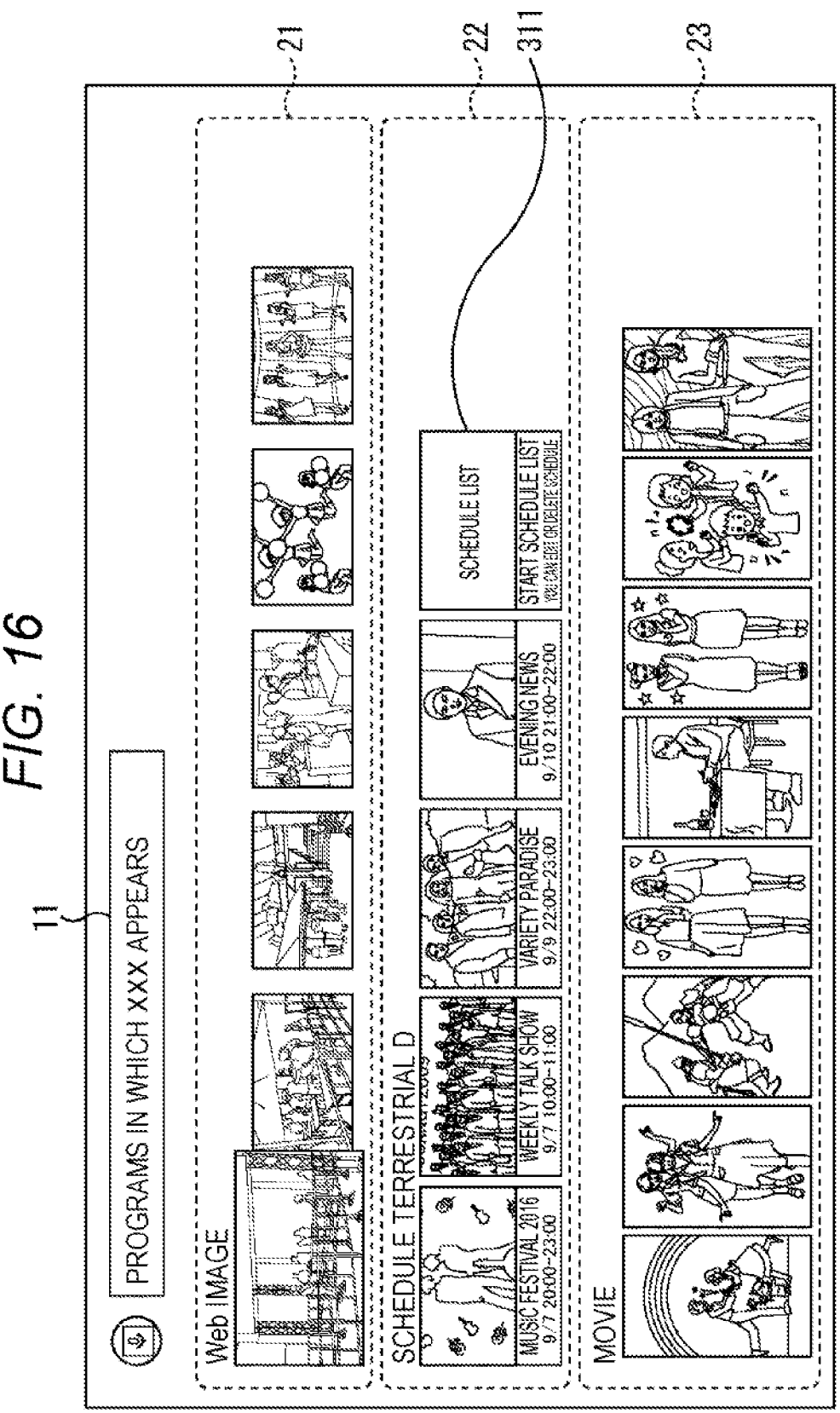
FIG. 16 is a diagram illustrating another example of the display of the search result screen.

FIG. 16 is a diagram illustrating another example of the display of the search result screen.

In the example illustrated in FIG. 16, a card image 311 that is selected in a case where a schedule list is displayed side by side with card images indicating the searched programs is displayed at the right end of a row of the programs that are being broadcast and the programs scheduled to be broadcast. In a case where the card image 311 is selected, the schedule list is displayed on the display 103.

The schedule list is a list of the programs whose schedule recording has been set. The schedule recording of programs can be modified or canceled from the schedule list.

Since the setting of schedule recording is completed only by selecting the card image of the program, the user is likely to set schedule recording by mistake. For this reason, a card image for displaying the schedule list is displayed to ensure a guide line to the schedule list on the search result screen. In this case, the user can easily modify the setting of schedule recording.

Figure 17:
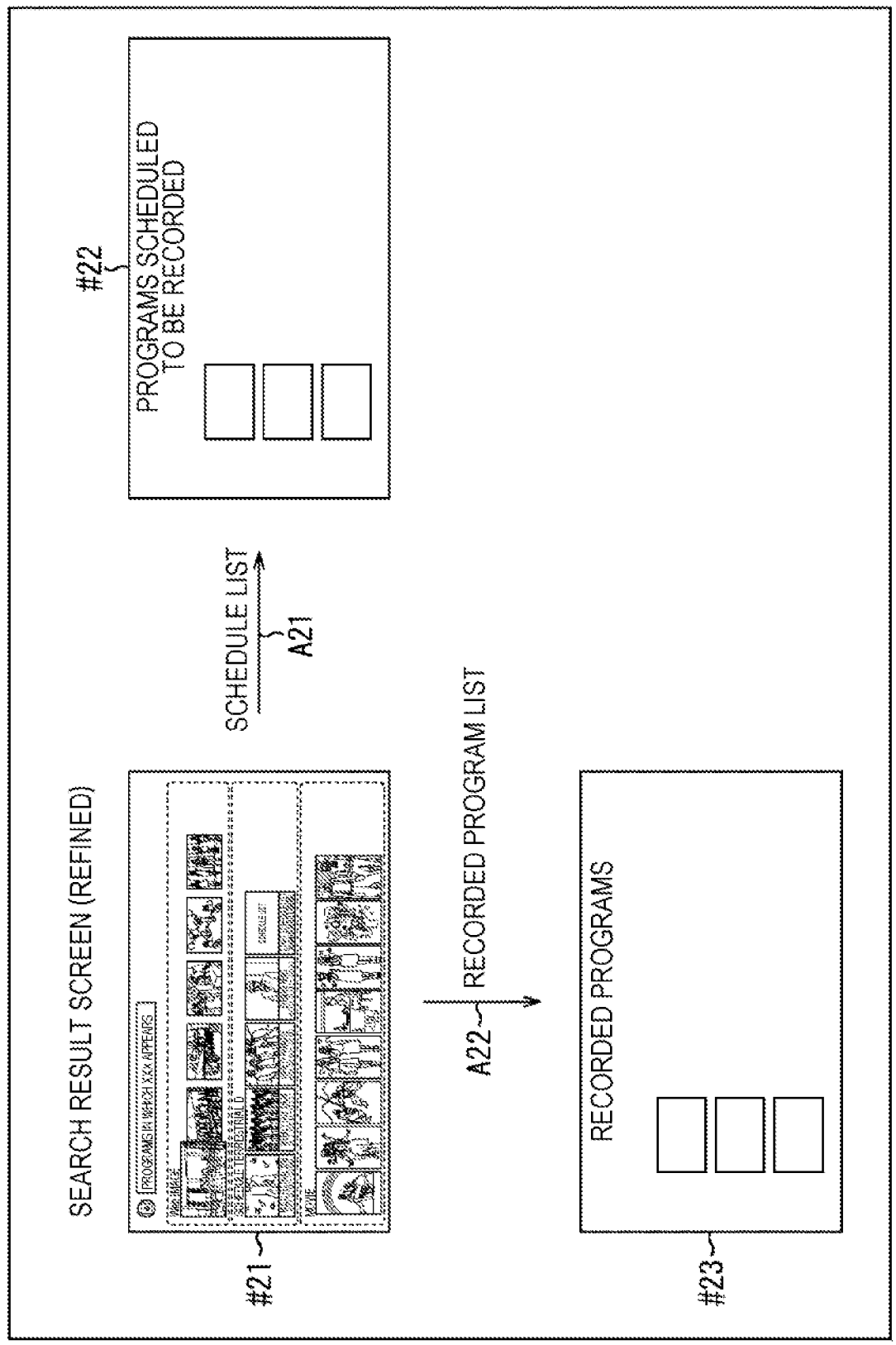
FIG. 17 is a diagram illustrating an example of the flow of screen display.

FIG. 17 is a diagram illustrating an example of the flow of screen display.

Search result screen #21 illustrated in FIG. 17 is the same as the screen illustrated in FIG. 16. In a case where the card image 311 is selected, the schedule list is displayed instead of the search result screen #21 as represented by an arrow A21. The schedule list may be displayed so as to be superimposed on the search result screen #21.

In a case where only the recorded programs are displayed as the search results, a guide line to a recorded program list is ensured on the search result screen #21. The recorded program list is a list of the recorded programs. The recorded program list is displayed on the basis of, for example, the information recorded on the recorded program recording unit 122.

In this case, a card image that is selected in a case where the recorded program list is displayed side by side with card images indicating the searched programs is displayed at the right end of a row of the recorded programs. In a case where the card image for displaying the recorded program list is selected, the recorded program list is displayed instead of the search result screen #21 as represented by an arrow A22 illustrated in FIG. 17.

As such, a guide line to other screens, such as the schedule list or the recorded program list, may be prepared on the search result screen.

5. Third Search Example

It is specified whether or not the user intends to view a recorded program or to set the schedule recording of a program that is being broadcast or a program scheduled to be broadcast, on the basis of the words uttered by the user. However, the program intended by the user may also be specified. In this case, information used to specify the program is managed by the cooperation server 2 and the program intended by the user is specified by the cooperation server 2.

For example, in a case where it is specified that the user intends to view a recorded program, the cooperation server 2 transmits a command to start the playback of the specified program to the TV 1. The TV 1 starts to play back the recorded program specified by the cooperation server 2, without displaying the search result screen.

In addition, in a case where it is specified that the user intends to set the schedule recording of the program that is being broadcast and the program scheduled to be broadcast, the cooperation server 2 transmits a command to set the schedule recording of the specified program to the TV 1. The TV 1 sets the schedule recording of the program specified by the cooperation server 2, without displaying the search result screen.

<5-1. Example of Screen Transition>

Figure 18:
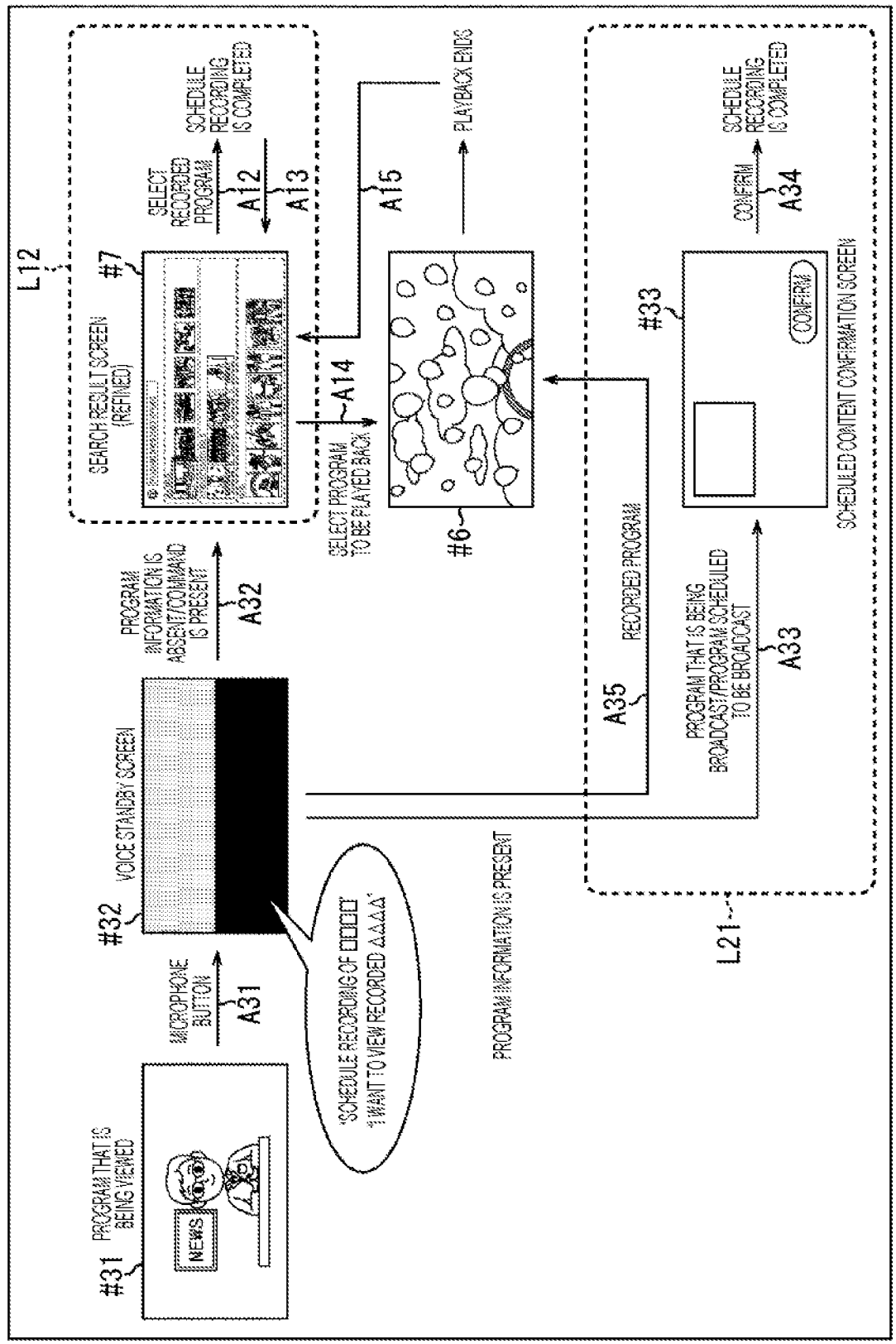
FIG. 18 is a diagram illustrating another example of the flow of the screen display.

FIG. 18 is a diagram illustrating another example of the flow of screen display.

Screen #31 illustrated at the left end of FIG. 18 is a screen of a program that is being viewed. For example, in a case where the user presses the microphone button of the remote controller 4 in this state, the TV 1 is changed to a state in which it waits for the input of the user's voice as represented by an arrow A31. The display of the display 103 is switched to screen #32 which is a voice standby screen.

Audio data transmitted from the remote controller 4 is transmitted to the cooperation server 2 and a character string indicating the content of the utterance of the user is acquired. The cooperation server 2 specifies the program intended by the user and the type of process for the program, on the basis of the acquired character string.

For example, the program is specified by detecting a program name included in the character string indicating the content of the utterance of the user. The cooperation server 2 manages the names of various programs.

In addition, for example, the type of process for the program is specified by detecting that the user has uttered the word "schedule" following a word with a specific attribute or by detecting that the user has uttered a word with a specific attribute following the word "recorded". The cooperation server 2 appropriately performs syntax analysis.

In a case where the program intended by the user is not capable of being specified, but the type of process for a certain program is specified, the recorded program list display command or the schedule recording setting command is transmitted from the cooperation server 2 to the TV 1.

The switching of screen display in this case is performed according to the procedure surrounded by a dashed line L12 as represented by an arrow A32. Screen display surrounded by the dashed line L12 illustrated in FIG. 18 is similar to the screen display surrounded by the dashed line L12 illustrated in FIG. 13.

That is, in a case where the user utters the word "schedule" or the like following a word with a specific attribute, the programs that are being broadcast and the programs scheduled to be broadcast, which have been searched on the basis of the decomposed character strings, are displayed on the search result screen. In a case where a predetermined program is selected from the programs that are being broadcast and the programs scheduled to be broadcast, schedule recording is set, without displaying the program detail screen, as represented by an arrow A12.

In addition, in a case where the user utters a word with a specific attribute following the word "recorded", the recorded programs searched on the basis of the decomposed character strings are displayed on the search result screen. In a case where a predetermined program is selected from the recorded programs as the search results, the recorded program starts to be played back as represented by an arrow A14.

In a case where the program intended by the user and the setting of schedule recording as the type of process for the program are specified, the display of the display 103 is switched to scheduled content confirmation screen #33 as represented by an arrow A33.

The scheduled content confirmation screen #33 is a screen that presents the content of the schedule recording of the program specified from the content of the utterance of the user. For example, scheduled content and a confirmation button that is operated to confirm the schedule are displayed on the scheduled content confirmation screen #33.

In a case where the confirmation button is operated, the schedule recording of the program is completed as represented by an arrow A34 and information indicating the content of the schedule recording is recorded on the program information recording unit 125. Then, the display of the display 103 returns to, for example, the screen #31. In a case where the program intended by the user and the setting of schedule recording as the type of process for the program are specified, schedule recording may be set, without displaying the scheduled content confirmation screen #33.

Further, in a case where the program intended by the user and the viewing of the recorded program as the type of process for the program are specified, the display of the display 103 is switched to the program playback screen #6 as represented by an arrow A35. The recorded program recording unit 122 reads the data of the recorded program and the playback control unit 123 plays back the recorded program.

As such, in a case where the program intended by the user and the type of process for the program are specified, the display of the display 103 is switched as surrounded by a dashed line L21.

With this configuration, the user can directly start the playback of a recorded program or can directly set the schedule recording of a program, without operating the search result screen, using words similar to conversation.

<5-2. Example of Operation of Information Processing System>

Here, the operation of the TV 1 and the cooperation server 2 implementing the above-mentioned screen display will be described with reference to a sequence diagram illustrated in FIG. 19.

Figure 19:
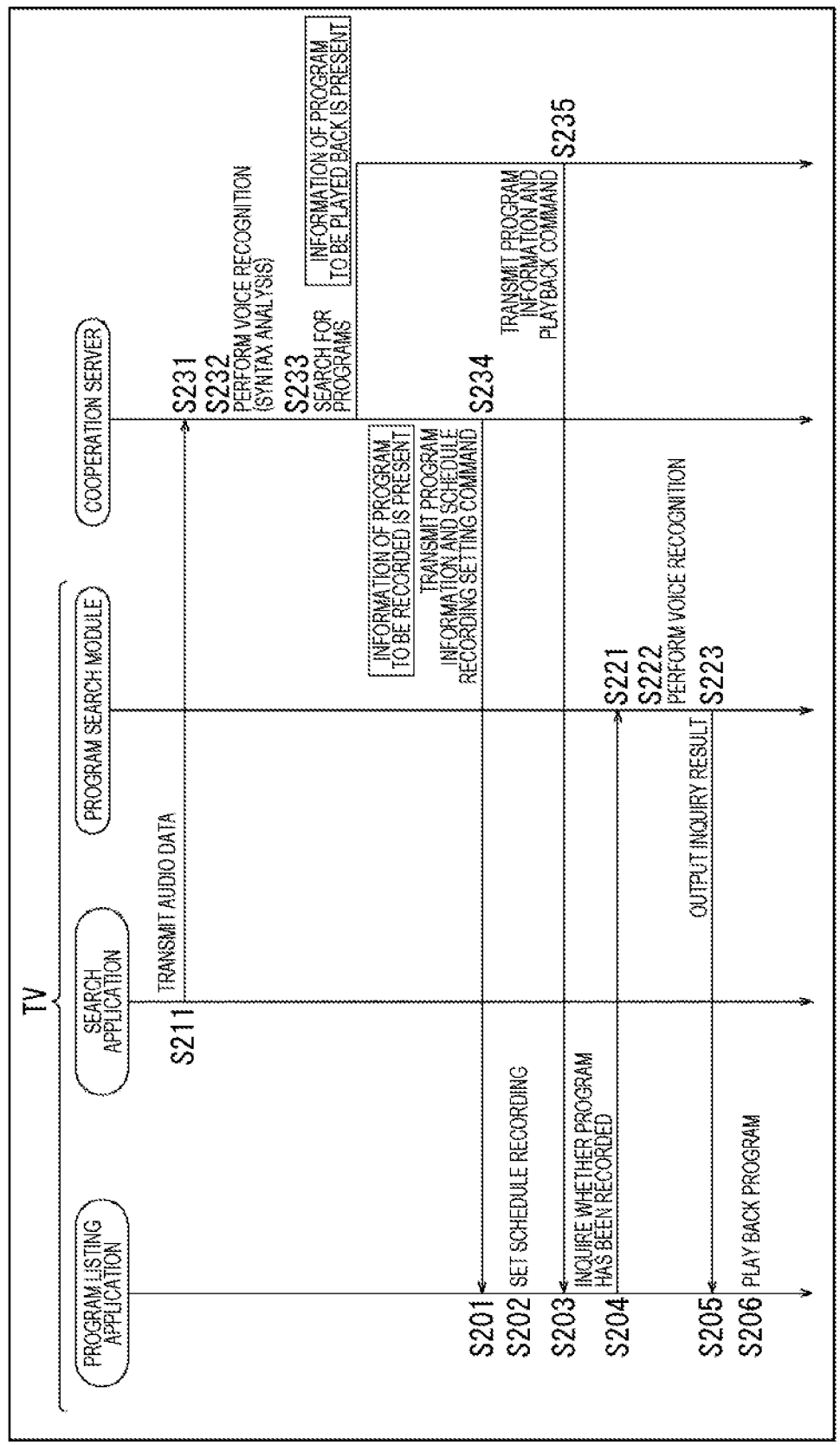
FIG. 19 is a sequence diagram illustrating still another operation of the information processing system.

The process illustrated in FIG. 19 start in a case where the TV 1 receives audio data transmitted from the remote controller 4.

In step S211, the character string acquisition unit 129 of the TV 1 transmits the audio data, which has been transmitted from the remote controller 4 and then received by the audio data receiving unit 128, to the cooperation server 2.

In step S231, the audio data acquisition unit 221 of the cooperation server 2 receives the audio data transmitted from the TV 1.

In step S232, the voice recognition unit 222 performs voice recognition on the basis of the audio data to generate a character string indicating the content of the utterance of the user. In addition, the voice recognition unit 222 performs appropriate syntax analysis for the generated character string. The voice recognition unit 222 specifies the type of process for a program on the basis of the character string indicating the content of the utterance of the user.

In step S233, the search unit 223 specifies a program intended by the user, for example, by using a character string indicating a program name obtained by the syntax analysis. The description will be made assuming that the program intended by the user has been specified. In a case where the program has not been specified, the similar process as that described with reference to FIG. 14 is performed.

In a case where a program that is being broadcast or a program scheduled to be broadcast is specified as the program intended by the user and the setting of schedule recording is specified as the type of process for the program, in step S234, the search unit 223 transmits program information and a schedule recording setting command to the TV 1. The program information includes the identification information of the program intended by the user.

In step S201, the schedule recording management unit 126 of the TV 1 receives the information transmitted from the cooperation server 2. The display control unit 132 displays a scheduled content confirmation screen on the basis of the information transmitted from the cooperation server 2. The units illustrated in FIG. 7 are connected to each other by paths (not illustrated) other than the paths represented by arrows in FIG. 7.

In a case where the confirmation of the schedule recording of the program is selected, in step S202, the schedule recording management unit 126 sets the schedule recording of the program identified by the identification information.

In contrast, in a case where a recorded program is specified as the program intended by the user and viewing is specified as the type of process for the program, in step S235, the search unit 223 transmits program information and a playback command to the TV 1.

The schedule recording management unit 126 of the TV 1 receives the information transmitted from the cooperation server 2 in step S203 and inquires of the program search unit 127 whether or not the program specified by the cooperation server 2 has been recorded in step S204. The inquiry from the schedule recording management unit 126 to the program search unit 127 includes the identification information of the program.

In step S221, the program search unit 127 receives the inquiry from the schedule recording management unit 126.

The program search unit 127 searches for the program specified by the cooperation server 2 from the recorded programs recorded on the recorded program recording unit 122 in step S222 and outputs the inquiry result to the schedule recording management unit 126 in step S223. Here, it is assumed that the program specified by the cooperation server 2, that is, the program intended by the user has been recorded.

In step S205, the schedule recording management unit 126 receives the inquiry result supplied from the program search unit 127.

In step S206, the schedule recording management unit 126 directs the playback control unit 123 to start to play back the program specified by the cooperation server 2 and to end the process.

The above-mentioned process makes it possible for the user to directly start the playback of a recorded program, without operating the search result screen, or to directly set the schedule recording of a program.

In the above description, the cooperation server 2 specifies the program intended by the user and the type of process for the program. However, the TV 1 may perform the specification.

In addition, the processes of the TV 1 that can be performed by voices are the setting of schedule recording and the playback of a recorded program. However, other types of processes, such as the setting of schedule viewing and the dubbing of a recorded program, may be performed by voices. In addition, other types of processes, such as the playback and purchase of Web content, may be performed by voices.

6. Modification Examples

In the above description, the TV 1 as an information processing apparatus and the cooperation server 2 form the information processing system. However, other apparatuses that can receive broadcast waves and the cooperation server 2 may form the information processing system.

For example, the information processing system can be formed by using a set-top box without a display for displaying content, a recording device, such as a hard disk recorder, or a portable terminal, such as a tablet terminal, instead of the TV 1.

In addition, at least some of the functions of the TV 1 may be provided in an apparatus outside the TV 1. For example, the function of the syntax analysis unit 131 among the functions illustrated in FIG. 7 may be provided in an external server and the TV 1 may perform each of the above-mentioned processes in cooperation with the external server. In addition, the recording unit 109 or a recorder may also be provided in the external server. Further, content may not be provided by broadcast waves, but may be provided from the external server through the Internet.

In addition, at least some of the functions illustrated in FIG. 7 may be provided in a portable terminal, such as a smart phone, that can communicate with the TV 1 and each of the above-mentioned processes may be performed by the TV 1 and the portable terminal.

Further, in the above description, the information processing system processes the character string indicating the content of the utterance of the user. However, the information processing system may be configured so as to process a character string input by, for example, the user through a keyboard or by a touch operation of the user, in addition to the content of the utterance of the user.

In the specification, the system means a set of a plurality of components (for example, apparatuses and modules (parts)). However, it does not matter whether or not all of the components are provided in the same housing. Therefore, the system includes a plurality of apparatuses that are accommodated in separate housings and are connected to each other through a network and one apparatus having a plurality of modules accommodated in one housing.

The series of processes may be performed by hardware or software. In a case where the series of processes is performed by software, a program forming the software is installed in, for example, a computer that is incorporated into dedicated hardware or a general-purpose personal computer.

The program to be installed is recorded on the removable medium 211 illustrated in FIG. 8 which is, for example, an optical disk (for example, a compact disc-read only memory (CD-ROM) or a digital versatile disc (DVD)) or a semiconductor memory and is then provided. In addition, the program may be provided through a wired or wireless transmission medium, such as a local area network, the Internet, or digital broadcasting. The program can be installed in the ROM 202 or the recording unit 208 in advance.

In addition, the program executed by the computer may be a program that is processed in time series along the order described in the specification or a program that is processed in parallel or at a necessary time such as at the time when a call is made.

The embodiment of the present technology is not limited to the above-described embodiment and can be changed in various ways without departing from the scope and spirit of the present technology.

For example, the present technology may have a cloud computing configuration in which one function is shared and processed by a plurality of apparatuses through a network.

In addition, each step described in the above-mentioned flowcharts may be performed by one apparatus or may be dispersively performed by a plurality of apparatuses.

Furthermore, in a case where one step includes a plurality of processes, the plurality of processes included in the one step may be performed by one apparatus or may be dispersively performed by a plurality of apparatuses.

<Example of Combination of Configurations>

The present technology may have the following configurations.

(1) An information processing apparatus including:

a program search unit that performs a search for a recorded program and a program to be provided later on the basis of a character string indicating content of an utterance of a user to acquire a first search result in a case where the character string does not include a first character string indicating setting of schedule recording of the program to be provided later and performs a search for the program to be provided later on the basis of the character string to acquire a second search result in a case where the character string includes the first character string;

a display control unit that performs control such that a display screen of the first search result or a display screen of the second search result is displayed; and a setting unit that, in a case where a predetermined program to be provided later is selected as a program whose schedule recording is to be set from the display screen of the first search result, displays a detail screen including information related to the predetermined program, instead of the display screen of the first search result, and sets the schedule recording of the predetermined program; and, in a case where a program whose schedule recording is to be set is selected from the display screen of the second search result, sets the schedule recording of the selected program without displaying the detail screen.

(2) The information processing apparatus according to (1), further including:

a syntax analysis unit that performs syntax analysis for the character string indicating the content of the utterance of the user, in which the program search unit may search for a program on the basis of decomposed character strings which are results of the syntax analysis to acquire the first search result or the second search result.

(3) The information processing apparatus according to (2), further including:

a content search unit that acquires a search result of content provided through a network based on the character string, in which the display control unit performs control such that the first search result or the second search result is displayed in addition to the search result of the content.

(4) The information processing apparatus according to (3), in which the content search unit acquires the search result of the content obtained by a server that provides the content on the basis of the character string.

(5) The information processing apparatus according to any one of (1) to (4), in which, in a case where the character string does not include the first character string and includes a second character string indicating a playback of a recorded program, the program search unit performs a search for the recorded program on the basis of the character string, and the display control unit performs control such that a search result of the recorded program is displayed.

(6) The information processing apparatus according to any one of (1) to (5), in which the display control unit performs control such that an image, which is operated in a case where a list of programs scheduled to be recorded is displayed, is displayed side by side with an image indicating the program which is the second search result.

(7) The information processing apparatus according to any one of (1) to (6), further including:

an acquisition unit that transmits audio data of the utterance to a server and acquires the character string transmitted from the server.

(8) An information processing method including:

performing a search for a recorded program and a program to be provided later on the basis of a character string indicating content of an utterance of a user to acquire a first search result in a case where the character string does not include a predetermined character string indicating setting of schedule recording of the program to be provided later;

in a case where a predetermined program to be provided later is selected as a program whose schedule recording is to be set from a display screen of the first search result, displaying a detail screen including information related to the predetermined program, instead of the display screen of the first search result, and setting the schedule recording of the predetermined program;

performing a search for the program to be provided later on the basis of the character string to acquire a second search result in a case where the character string indicating the content of the utterance of the user includes the predetermined character string; and in a case where a program whose schedule recording is to be set is selected from a display screen of the second search result, setting the schedule recording of the selected program without displaying the detail screen.

(9) A program that causes a computer to perform a process including steps of:

performing a search for a recorded program and a program to be provided later on the basis of a character string indicating content of an utterance of a user to acquire a first search result in a case where the character string does not include a predetermined character string indicating setting of schedule recording of the program to be provided later;

in a case where a predetermined program to be provided later is selected as a program whose schedule recording is to be set from a display screen of the first search result, displaying a detail screen including information related to the predetermined program, instead of the display screen of the first search result, and setting the schedule recording of the predetermined program;

performing a search for the program to be provided later on the basis of the character string to acquire a second search result in a case where the character string indicating the content of the utterance of the user includes the predetermined character string; and in a case where a program whose schedule recording is to be set is selected from a display screen of the second search result, setting the schedule recording of the selected program without displaying the detail screen.

(10) An information processing system including:

a server including:

a search unit that specifies a program whose schedule recording is to be set in a case where a character string indicating content of an utterance of a user includes a first character string indicating setting of the schedule recording of a program to be provided later; and a communication unit that transmits first identification information of the specified program and a first command to set schedule recording to an information processing apparatus in a case where the program whose schedule recording is to be set is specified and transmits a search result of content based on the character string to the information processing apparatus in a case where the program whose schedule recording is to be set is not specified; and the information processing apparatus including:

a communication unit that transmits audio data of the utterance to the server and receives information transmitted from the server;

a program search unit that searches for a program on the basis of the character string transmitted from the server;

a display control unit that performs control such that a display screen including the search result of the content and a search result of the program is displayed in a case where the search result of the content is transmitted from the server; and a setting unit that sets the schedule recording of a program identified by the first identification information, without displaying the display screen, in a case where the first identification information and the first command are transmitted from the server.

(11) The information processing system according to (10), in which the search unit of the server specifies a program to be played back in a case where the character string does not include the first character string and includes a second character string indicating a playback of a recorded program, in a case where the program to be played back is specified, the communication unit of the server transmits second identification information of the specified program and a second command to start playback to the information processing apparatus, and the information processing apparatus further includes a playback control unit that starts the playback of a recorded program identified by the second identification information, without displaying the display screen, in a case where the second identification information and the second command are transmitted from the server.

(12) An information processing apparatus including:

a communication unit that transmits audio data of an utterance of a user to a server which specifies a program whose schedule recording is to be set in a case where a character string indicating content of the utterance of the user includes a predetermined character string indicating setting of the schedule recording of a program to be provided later, transmits identification information of the specified program and a command to set schedule recording in a case where the program whose schedule recording is to be set is specified, and transmits a search result of content based on the character string in a case where the program whose schedule recording is to be set is not specified and receives information transmitted from the server;

a program search unit that searches for a program on the basis of the character string transmitted from the server;

a display control unit that performs control such that a display screen including the search result of the content and a search result of the program is displayed in a case where the search result of the content is transmitted from the server; and a setting unit that sets the schedule recording of a program identified by the identification information, without displaying the display screen, in a case where the identification information and the command are transmitted from the server.

REFERENCE SIGNS LIST

1 Television set
2 Cooperation server
121 Recording control unit
122 Recorded program recording unit
123 Playback control unit
124 Broadcast wave reception control unit
125 Program information recording unit
126 Schedule recording management unit
127 Program search unit
128 Audio data receiving unit
129 Character string acquisition unit
130 Web content search unit
131 Syntax analysis unit
132 Display control unit
221 Audio data acquisition unit
222 Voice recognition unit
223 Search unit

The invention claimed is:

1. An information processing apparatus comprising:
a program search unit operable to perform
(i) a search for a recorded program and
(ii) a search for a scheduled program, on a basis of a character string indicating content of an utterance of a user, to generate a first search result when the character string does not include a first character string indicating scheduling of recording of the scheduled program; and that performs a search for the scheduled program, on a basis of the character string, to generate a second search result when the character string includes the first character string indicating scheduling of recording of the scheduled program;
a display control unit that performs control such that a display screen of the first search result or a display screen of the second search result is displayed; and
a setting unit that, when a predetermined scheduled program is selected as a program for which recording is to be scheduled from the display screen of the first search result, displays a detail screen including information related to the predetermined scheduled program, instead of the display screen of the first search result, and schedules recording of the predetermined scheduled program; and, when a program for which recording is to be scheduled is selected from the display screen of the second search result, schedules recording of the selected program without displaying the detail screen.

2. The information processing apparatus according to claim 1, further comprising:
a syntax analysis unit that performs syntax analysis for the character string indicating the content of the utterance of the user,
wherein the program search unit searches for a program on a basis of decomposed character strings which are results of the syntax analysis to acquire the first search result or the second search result.

3. The information processing apparatus according to claim 1,
wherein, when the character string does not include the first character string and includes a second character string indicating a playback of a recorded program, the program search unit performs a search for the recorded program on a basis of the character string, and
the display control unit performs control such that a search result of the recorded program is displayed.

4. The information processing apparatus according to claim 1,
wherein the display control unit performs control such that an image, which is operated in a case where a list of programs scheduled to be recorded is displayed, is displayed side by side with an image indicating the program which is the second search result.

5. The information processing apparatus according to claim 1, further comprising:
an acquisition unit that transmits audio data of the utterance to a server and acquires the character string transmitted from the server.

6. The information processing apparatus according to claim 2, further comprising:
a content search unit that acquires a search result of content provided through a network based on the character string,
wherein the display control unit performs control such that the first search result or the second search result is displayed in addition to the search result of the content.

7. The information processing apparatus according to claim 6,
wherein the content search unit acquires the search result of the content obtained by a server that provides the content on a basis of the character string.

8. An information processing method comprising:
(i) performing a search for a recorded program and
(ii) performing a search for a scheduled program, on a basis of a character string indicating content of an utterance of a user, to generate a first search result when the character string does not include a predetermined character string indicating scheduling of recording of the scheduled program;
when a predetermined scheduled program is selected as a program for which recording is to be scheduled from a display screen of the first search result, displaying a detail screen including information related to the predetermined scheduled program, instead of the display screen of the first search result, and scheduling recording of the predetermined scheduled program;
performing a search for the scheduled program, on a basis of the character string, to generate a second search result when the character string indicating the content of the utterance of the user includes the predetermined character string; and
when a program whose schedule recording is to be scheduled is selected from a display screen of the second search result, scheduling recording of the selected program without displaying the detail screen.

9. A non-transitory computer-readable medium having stored thereon a computer-readable program that causes a computer to perform a process including steps of:
(i) performing a search for a recorded program and
(ii) performing a search for a scheduled program, on a basis of a character string indicating content of an utterance of a user, to generate a first search result when the character string does not include a predetermined character string indicating scheduling of recording of the scheduled program;

when a predetermined scheduled program is selected as a program for which recording is to be scheduled from a display screen of the first search result, displaying a detail screen including information related to the predetermined scheduled program, instead of the display screen of the first search result, and scheduling recording of the predetermined scheduled program;

performing a search for the scheduled program on a basis of the character string to generate a second search result when the character string indicating the content of the utterance of the user includes the predetermined character string; and when a program whose schedule recording is to be scheduled is selected from a display screen of the second search result, scheduling recording of the selected program without displaying the detail screen.

10. An information processing system comprising:
a server including:
a search unit that specifies a program to be recorded, the program to be recorded being specified when a character string indicating content of an utterance of a user includes a first character string indicating scheduling recording of a scheduled program; and
a communication unit that transmits first identification information of the program to be recorded and a first command to schedule recording to an information processing apparatus when the program to be recorded is specified and transmits a search result of content based on the character string to the information processing apparatus when the program to be recorded is not specified; and
the information processing apparatus including:
a communication unit that transmits audio data of the utterance to the server and receives information transmitted from the server;
a program search unit that searches for a program on a basis of the character string transmitted from the server;
a display control unit that performs control such that a display screen including the search result of the content and a search result of the program is displayed when the search result of the content is transmitted from the server; and
a setting unit that schedules recording of the program to be recorded identified by the first identification information, without displaying the display screen, when the first identification information and the first command are transmitted from the server.

11. The information processing system according to claim 10,
wherein the search unit of the server specifies a program to be played back when the character string does not include the first character string and includes a second character string indicating a playback of a recorded program,
when the program to be played back is specified, the communication unit of the server transmits second identification information of the specified program and a second command to start playback to the information processing apparatus, and
the information processing apparatus further includes a playback control unit that starts the playback of a recorded program identified by the second identification information, without displaying the display screen, when the second identification information and the second command are transmitted from the server.

12. An information processing apparatus comprising:
a communication unit that transmits audio data of an utterance of a user to a server which specifies a program for which recording is to be scheduled when a character string indicating content of the utterance of the user includes a predetermined character string indicating scheduling of recording of a scheduled program, transmits identification information of the specified program and a command to schedule recording when the program for which recording is to be scheduled is specified, and transmits a search result of content based on the character string when the program for which recording is to be scheduled is not specified and receives information transmitted from the server;
a program search unit that searches for a program on a basis of the character string transmitted from the server;
a display control unit that performs control such that a display screen including the search result of the content and a search result of the program is displayed when the search result of the content is transmitted from the server; and
a setting unit that schedules recording of the program to be recorded, without displaying the display screen, when the identification information and the command are transmitted from the server.

* * * * *